(12) United States Patent
Fox et al.

(10) Patent No.: US 7,003,480 B2
(45) Date of Patent: Feb. 21, 2006

(54) GUMP: GRAND UNIFIED META-PROTOCOL FOR SIMPLE STANDARDS-BASED ELECTRONIC COMMERCE TRANSACTIONS

(75) Inventors: Barbara L. Fox, Seattle, WA (US); Brian A. LaMacchia, Seattle, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 09/032,407

(22) Filed: Feb. 27, 1998

(65) Prior Publication Data

US 2002/0069174 A1    Jun. 6, 2002

Related U.S. Application Data

(60) Provisional application No. 60/039,176, filed on Feb. 27, 1997.

(51) Int. Cl.
*G06F 17/60* (2006.01)

(52) U.S. Cl. .......................................... 705/26; 705/76
(58) Field of Classification Search .................. 705/26, 705/76, 69, 75, 78; 380/24, 23, 25, 21, 280; 723/200; 235/380; 382/100
See application file for complete search history.

(56) References Cited

U.S. PATENT DOCUMENTS

| | | | | |
|---|---|---|---|---|
| 4,924,515 A | * | 5/1990 | Matyas et al. | 380/280 |
| 4,941,176 A | * | 7/1990 | Matyas et al. | 380/21 |
| 5,455,407 A | * | 10/1995 | Rosen | 235/380 |
| 5,557,518 A | * | 9/1996 | Rosen | 705/69 |
| 5,717,989 A | * | 2/1998 | Tozzoli et al. | 705/37 |
| 5,764,789 A | * | 6/1998 | Pare, Jr. et al. | 340/825.34 |
| 5,790,677 A | * | 8/1998 | Fox et al. | 705/78 |

(Continued)

FOREIGN PATENT DOCUMENTS

JP    58168179    * 10/1983

OTHER PUBLICATIONS

Bruce Schneier, Applied Cryptography, 2d. (New York: John Wiley & Sons, Inc., 1996). pp. 58-59, Jan. 1, 1996.*

(Continued)

*Primary Examiner*—James W. Myhre
(74) *Attorney, Agent, or Firm*—Ronald M. Anderson

(57) ABSTRACT

A method for facilitating two-party electronic commerce transactions between trading partners on an unsecure network, such as the Internet. In one example, a client makes application for registration by a financial institution in which the client has one or more accounts. The client submits satisfactory proof of identity and a public key portion for a digital signature to the financial institution. The financial institution may provide the client a one time secret by a secure route, such as conventional mail, which can then be used by the client to show proof of its identity. The financial institution authenticates the one time secret and combines it with the client's public key in a GUMP Relationship Certificate (GRC), which it issues to the client over the network. Once issued, the GRC can be used by the client to authenticate its right to access its account(s) or other products or services at the financial institution and when conducting other electronic transactions over the network. The client digitally signs any such transaction to authenticate its right to conduct the transaction. A delegate may be enlisted by the client to negotiate the purchase of goods from a seller or for other purposes, using a GUMP Delegate Certificate. The concept can be extended to other three party transactions, such as issuing an electronic Letter of Credit (LOC).

25 Claims, 14 Drawing Sheets

U.S. PATENT DOCUMENTS

| | | | |
|---|---|---|---|
| 5,799,086 A * | 8/1998 | Sudia | 705/76 |
| 5,832,089 A * | 11/1998 | Kravitz et al. | 705/69 |
| 5,832,100 A * | 11/1998 | Lawton et al. | 382/100 |
| 5,878,139 A * | 3/1999 | Rosen | 705/75 |
| 5,892,900 A * | 4/1999 | Ginter et al. | 713/200 |
| 5,987,132 A * | 11/1999 | Rowney | 380/24 |

OTHER PUBLICATIONS

Fox, B. and Beckman, B. "GUMP Grand Unified Meta-Protocols recipes for simple, standards-based financial cryptography." (Berlin: Springer-Verlag, 1997) Abstract. pp. 1-2.*

* cited by examiner

GUMP: GRAND UNIFIED META-PROTOCOL FOR SIMPLE STANDARDS-BASED ELECTRONIC COMMERCE TRANSACTIONS

RELATED APPLICATION

This application is a continuation-in-part of prior now abandoned provisional Application Ser. No. 60/039,176, filed Feb. 27, 1997, priority in the filing date of which is hereby claimed under 35 United States Code Section 119(e).

FIELD OF THE INVENTION

The present invention generally relates to a method for performing electronic commerce transactions, and more specifically, to a method or protocol that simplifies two-party electronic commerce transactions between trading partners, so as to ensure the authenticity of a trading partner during a transaction conducted over a network.

BACKGROUND OF THE INVENTION

Electronic commerce is a relatively new term used to describe any form of computerized financial transaction between business trading partners, both by consumers and from company to company. These financial transactions are performed by the exchange of electronic versions of commerce instruments and documents. Examples of commerce instruments include credit cards, checks, and forms of currency. Examples of commerce documents include receipts, bills of lading, purchase orders, contracts, and Letters of Credit. Generally, the computerized exchange of a commerce instrument and/or document is implemented through the transfer of structured data by electronic means from one computer application to another computer application over some type of network, such as a local area network (LAN), wide area network (WAN), or the Internet, using mutually agreed upon message standards.

A growing number of financial applications are migrating to networks, such as the Internet. Some applications, like home banking and bill payment, are already commonly conducted as electronic transactions over networks. Other newer applications, like brokerage account management and business-to-business purchasing, are being adapted for implementation over the Internet. In each of these applications, there is a common need to protect certain interests of the trading partners and minimize the risks to all participants in regard to the following concerns.

If electronic transactions over public networks are to be accepted, there must be some assurance that the participants are authentic (each participant must be who they claim to be), and the documents and instruments electronically exchanged between parties must have integrity. Further, all participants must have a reasonable expectation that the transaction may not be repudiated at a later date. There is also a need for privacy, so that the knowledge of a transaction may be kept solely among the participants and not accessible by any unauthorized party. Furthermore, a financial application must coexist with the existing legacy electronic financial systems.

Historically, most of these requirements were met in legacy systems by the employment of a proprietary and closed electronic commerce system that had a high security protocol. In such a system, the participants and the electronic instruments and documents are authentic and private by definition and by the steps taken to prevent access to the secure system by others. Further, the integrity of instruments and documents and their non-repudiation were controlled by the proprietary nature of the closed commerce system. However, interaction with other secure commerce systems was typically not provided.

The transition from closed commerce systems to transactions conducted over a public network such as the Internet has been eased by the availability of public-key cryptography. Virtually all web servers and client browsers support secure-channel protocols and public-key authentication, at least on the server. With the recent deployment of the Secure Sockets Layer (SSL) protocol, public-key authentication by the client is now also widely available. Thus, many of the requirements noted above to enable the use of financial applications on the Internet (or other public access network) are becoming commonplace protocols, which are readily available.

However, as the number for electronic financial transactions conducted over public networks continues to increase, there has developed a need for a simplified (computationally less intensive) method or meta-protocol that will facilitate two-party financial transactions between trusted and non-anonymous trading partners. In financial transactions, "trust" does not have a moral connotation. Instead, financial trust indicates that a trading partner has shown either by previous activities or submission of documents/instruments that the trading partner will be responsible for financial obligations arising from the transaction. Trusted trading partners can provide each other with a reasonable expectation of integrity, privacy and non-repudiation. Since the amount of encryption required to guarantee integrity and privacy for a two-party transaction between trusted partners is less than transactions between strangers, the computational overhead should be reduced. Thus, there is a need in the financial community for a simplified method or protocol that will facilitate two-party electronic commerce transactions between trading partners connected on a public network. This method should enable two parties to become trusted trading partners by defined series of steps that provide the required assurance of authenticity, privacy, and non-repudiation.

SUMMARY OF THE INVENTION

In accord with the present invention a method is defined for enabling a user to perform an electronic commerce transaction over an unsecure network without requiring encryption. The user (first party) applies for registration with a second party, the first party having access to financial resources through the second party. A certified identifier of the first party is presented to the second party for enabling the second party to confirm a true identity of the first party. The second party transfers a certificate to the first party over the unsecure network. The certificate is digitally signed by the second party and includes the certified identifier, which provides an index to the financial resources accessible to the first party through the second party. The certificate is digitally signed by the first party and provided to a seller over the unsecure network. The signed certificate indicates that the first party agrees to make a payment for goods provided by the seller in an amount indicated in the certificate. The seller presents the signed certificate to the second party over the unsecure network in exchange for the payment for goods. The second party employs the amount indicated in the signed certificate to make the payment to the seller from the financial resources accessible by the first party.

Preferably, the identifier is a one time secret (OTS) that enables the second party to initially confirm the identity of the first party. The OTS is associated with a public key of the first party's digital signature that is submitted by the first party to the second party. Next, the OTS becomes an unsecret and serves as the index to the financial resources accessible to the first party through the second party. Also, the unsecret is bound to the public key of the digital signature of the first party in the certificate. Further, the unsecret may be a hash value of data known to the second party. In one embodiment, the unsecret is the result of hashing reference numbers for the financial resources accessible to the first party. In another embodiment, the unsecret is a hash value computed over any data known to the second party that may be unambiguously linked to the financial resources of the first party. In yet another embodiment, the unsecret is derived from information shared between the first party and the second party.

Additionally, the digital signature is unique to the first party and includes both the public key and a private key, the private key being employed by the first party to transform the certificate, creating an encoded certificate, and the public key being employed by others to verify the encoded certificate.

The first party may apply to a registry for registration of the first party's digital signature. The registry will attempt to confirm the true identity of the first party. If confirmed, the digital signature of the first party will be registered with the registry. The registry will continue to register the digital signature until the registry is informed that the private key associated with the digital signature is not secure. Also, the first party may provide to the registry a certificate issued by another registry. The registry will employ the certificate issued by the other registry to confirm the identity of the first party.

In one embodiment, the first party submits a certificate issued by a third party to the second party as the certified identifier to prove the true identity of the first party, each additional different certificate thus submitted tending to increase a measure of confidence by the second party that the identity of the first party is true. For another embodiment, the second party will employ a replay detector to determine if the certificate digitally signed by the first party has been reused since it was signed.

In another embodiment, the first party issues a delegation certificate to a delegate over the unsecure network. The delegation certificate provides the delegate with an authority to negotiate with the seller on behalf of the first party. When the first party digitally signs the delegation certificate, the payment for the goods provided by the seller in an amount indicated in the certificate is authorized. The delegate presents the signed delegation certificate to the seller in exchange for the goods. The seller redeems the delegation certificate with the second party to obtain the payment from the financial resources accessible by the first party.

In yet another embodiment, the first party is a client and the second party is a financial institution, such as a bank. For another embodiment, the first party is a customer and the second party is a non-financial institution, including a service provider and a merchant.

Another embodiment enables the first party (user) to obtain a certificate employed to facilitate transactions with the second party over an unsecure network. The certificate is issued by the second party and assures an authenticity of the first party. The first party provides proof of its identity to the second party by submitting a public key for the first party's digital signature to the second party over the unsecure network. The second party confirms the identity of the first party and combines the public key with a unique reference identifying the first party in connection with business transacted between the first and the second parties. The combination of the public key and the unique reference is employed to produce the certificate, which is digitally signed by the second party. The certificate is issued to the first party over the unsecure network by the second party. The first party is enabled to digitally sign and submit the certificate to the second party over the unsecure network to prove a right of the first party to transact business with the second party.

A further embodiment enables a buyer to perform an electronic commerce transaction for goods on an unsecure network without requiring encryption, using a Letter Of Credit (LOC). The buyer applies for a LOC with an opening bank, which approves the LOC when the true identity of the buyer and terms of the LOC have been authenticated. Typically, the opening bank is associated with accessing the financial resources of the buyer. An identifier is provided to the opening bank that enables the opening bank to independently determine the true identity of the buyer. The opening bank issues a certificate that is digitally signed by the opening bank and which includes the identifier and a reference to the LOC. The opening bank sends the certificate to the client and a beneficiary, such as a seller, over the unsecure network. The beneficiary sends the certificate to an advising bank that is associated with the beneficiary. The seller sends a digitally signed commerce document to the advising bank over the unsecure network when the terms of the LOC have been met. The advising bank digitally signs and transmits the certificate over the unsecure network, to the opening bank for payment of the LOC. The signing of the certificate by the advising bank indicates that the advising bank guarantees the seller has met all of the terms of the LOC. The opening bank sends the payment for the goods to the advising bank for dispersal to the beneficiary.

Further, the advising bank may confirm that the certificate is valid with the opening bank prior to completion of the transaction. Also, the advising bank and the opening bank may confirm the terms of the LOC that must be completed before the certificate may be redeemed at the opening bank. The terms of the LOC may identify a type for the document, including a bill of lading and a receipt. The advising bank may review the performance of the terms of the LOC and negotiate with the seller to ensure performance of the terms. If the advising bank determines that the seller has not met the terms of the LOC, the advising bank may advise the opening bank that the terms of the LOC have not been met. In addition, if the advising bank determines that the seller has only partially completed the terms of the LOC, the advising bank may accept liability for completion of all terms of the LOC and digitally sign the certificate to confirm acceptance of the liability.

Another aspect of the present invention is directed to a computer-readable medium having computer-executable instructions for enabling a user to perform an electronic commerce transaction over an unsecure network without requiring encryption. The computer-readable medium stores a plurality of logical steps that a digital computer system employs to implement a plurality of functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF A PREFERRED EMBODIMENT

Figure 1:
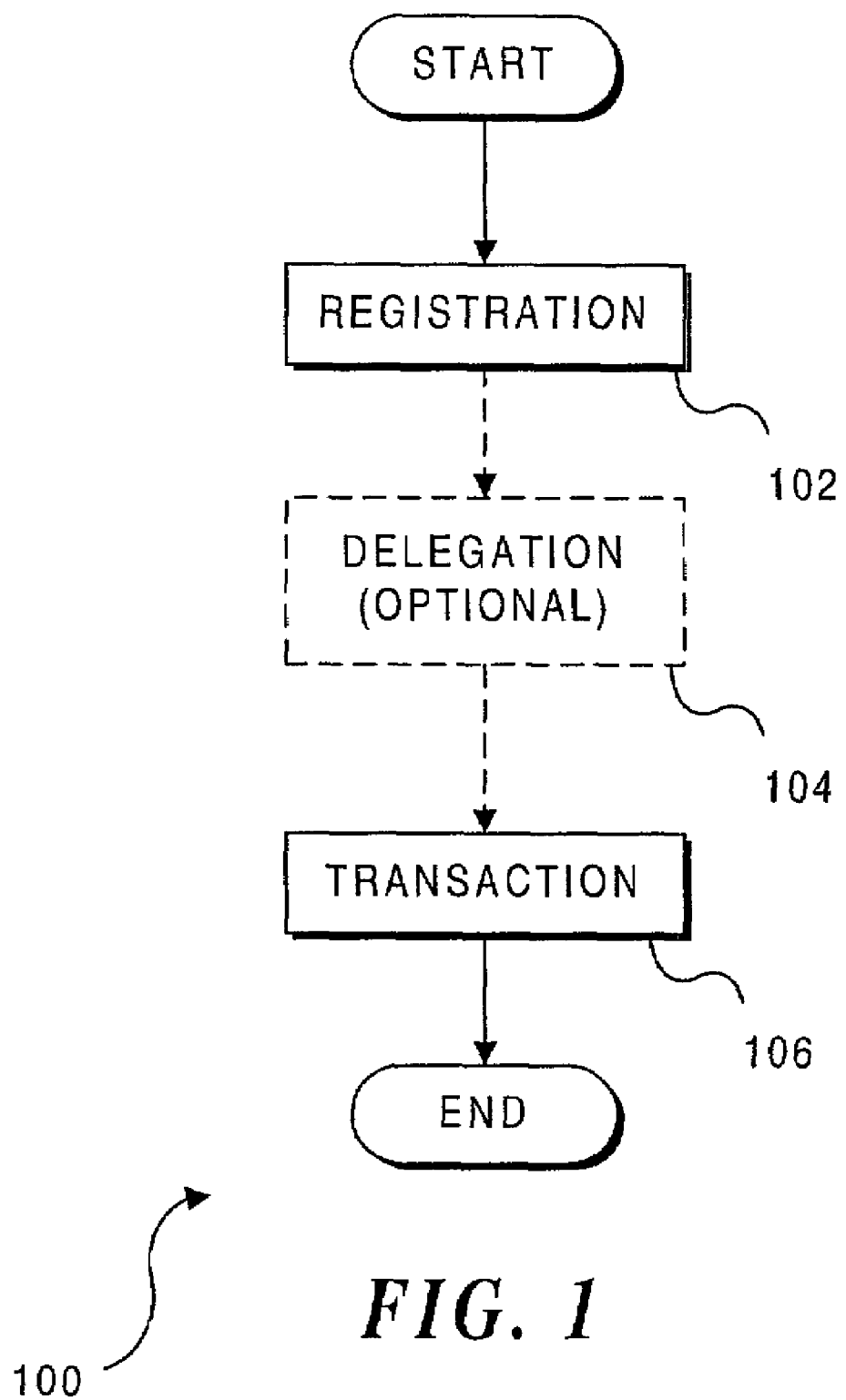
FIG. 1 is a functional block overview of the main steps in a grand unified meta-protocol (GUMP) electronic commerce transaction in accord with the present invention.

Secure Sockets Layer (SSL) is a de facto standard for secure Hyper Text Transport Protocol (HTTP) connections over the Internet (or other networks). Presently, there are at least 40 million web browsers and web servers on the Internet that are capable of running SSL as Transport Layer Security (TLS). The present invention, which is referred to as a Grand Unified Meta-Protocol (GUMP), provides a standardized and interoperable application protocol for facilitating electronic transactions between parties by building on well known TLS protocols, such as SSL and Secure Hyper Text Protocol (SHTTP).

GUMP provides several functional features. First, it enables authentication of a party using passwords or personal identification numbers (PINs) without requiring that they be transmitted over a limited security (e.g., 40-bit) encryption channel. Second, as explained in detail below, GUMP provides a generic, "fill-in-the-blanks" financial application suite that leverages TLS client authentication to accommodate financial-institution relationship certificates, which should be distinguished from generic identity certificates, which have no binding to a relationship between a client and a financial institution. Lastly, GUMP provides a non-cryptographic technique for "Internet-safe" transactions with delegation, by building on the relationship certificate feature.

A primary design goal for GUMP was that it be built with available components, which is especially important in regard to financial applications. Because GUMP starts with well understood, mature, standards-based secure protocols, such as SSL/TLS, it has the following advantages:

Interoperability and access to a broad, cross-platform installed base;

Reduced cost to understand, analyze, and approve;

Reduced cost to design, implement, integrate, and deploy;

Built-in evolution path through the Internet Engineering Task Force's (IETF) TLS standards process; and Presumption that a cryptographic bedrock like random number generation, key exchange, and authentication are done correctly.

The following premises drive the GUMP approach. First, HTTP is, by far, the most important transport for Internet financial applications for the foreseeable future. TLS, with its proposed extensions and using embedded signed documents, can service virtually all security requirements of financial applications, when those requirements are sufficiently simplified. These proposed extensions to TLS provide secure shared-secret authentication to support registration. SSL version 3.0 provides mutual authentication and moderate privacy. Embedded signed documents can ensure non-repudiation for transactions and support store-and-forward backend applications.

Second, transactions are fundamentally two-party affairs. Multi-phase, multiplexed, staged, forwarded, and nested transactions can all be designed out of two-party elements.

Third, public-key authentication protocols are easier to implement and deploy than are shared-secret authentication protocols. Use of shared-secret protocols should be minimized and eliminated where possible; however, integration with legacy systems will require their use in some circumstances.

Fourth, clients should sign all transactions digitally. By employing digital signatures, a transaction protocol provides assurances against repudiation and freedom from managing secret authentication data. Account numbers, PINs, and passwords become worthless to a third party, since they cannot be used without also creating a valid digital signature, assuming replay protection exists. The third party cannot create a valid signature without controlling the client's private key. This premise implies that each client must have a certified signature key.

Fifth, financial institutions will (or should) insist on managing their own client name data. In a public-key setting, this requirement implies that financial institutions will issue their own certificates for client signature keys, since they need to bind their own attributes—like account numbers—to principals that they recognize.

Financial Applications—Basics:

Assume, as a baseline, that clients of any financial application demand a private channel, insist on mutual authentication, and agree to sign every transaction. Of these assumptions, mutual authentication is the least understood.

In the paper-and-ink world, possession of a government issued document—presumed uncopyable—often suffices, but this presumption does not apply in the electronic world where almost anything can be copied. In the electronic world, one party authenticates the other by getting the other party to prove current possession of one or more secrets: a password, PIN, shared secret key, or the private half of a public-private key pair. In financial protocols, and especially on public networks like the Internet, requirements for each of these types of proof of authenticity often coexist within the same session. The term certification is used herein to mean establishing a way for this proof to be made so that authentication can proceed later on in a manner mutually acceptable to the client and the financial institution. It will be helpful to first describe a traditional, non-electronic certification protocol as a prelude to describing GUMP's meta-protocols.

Traditional, Non-Electronic Certification Protocol:

A typical client makes use of a number of products and services provided by a financial institution. For example, the client may have demand-deposit accounts, mortgages, unsecured loans, annuities, insurance accounts, credit cards, debit cards, check cards, ATM cards, and brokerage accounts at a single institution. The institution and client agree on an account number for each distinguishable product or service provided the client by the institution, but the set of account numbers are bound to a single client identity—indeed, they constitute the client identity from the point of view of the institution. No mere name and address, etc., would suffice to identify the client, without the account numbers. This definition of identity benefits both the client and the institution. The client will have freedom to readily access the various accounts, and the institution can track the client's activities for legal and business purposes.

The traditional certification protocol generally proceeds as follows:

MEETING: The client and an official of the financial institution meet face-to-face.

IDENTIFY: The client provides satisfactory proof of identity—at least as defined by the applicable laws—to the official of the institution. This proof may be in the form of a birth certificate, driver's license, passport, employer picture ID, etc.

PRESENT: The official copies some of the identity information and other information to a paper signature card and presents the card to the client for signature (in anticipation of the digital analog of this protocol, the card is referred to herein as a preimage at this moment, since it is not yet signed). The information on the card is a matter of institution policy, but typically includes a master account number or some other kind of primary index key into the institution's client database.

RETURN: The client signs the paper signature card with ink and gives it back to the official. Perhaps the client signs one card for each account. More interestingly from the perspective of GUMP, the client may sign a single card that lists all the client's account numbers.

FILE: The official of the institution countersigns the card and files it, making it a signature-on-file (SOF).

After the traditional certification protocol is successfully completed, the financial institution accepts transaction orders only when accompanied by a fresh paper-and-ink client signature that an official of the institution can compare against the SOF. The institution may typically use one SOF for a whole collection of accounts accessed by a single client, that is, for a whole collection of products and services provided the client. The SOF becomes the institution's permanent record of evidence of prior authentication.

The term "authentication" is also used herein to refer to the later comparison of signatures on transaction orders against the SOF, noting that authentication, in this latter usage, is authentication of the transaction, not of the client per se.

The security of the traditional certification protocol arises from the following assumptions. Paper-and-ink signatures are hard to forge. Only professional criminals are likely to be successful at forgery; and casual counterfeit transactions are not feasible. The official of the financial institution can be trained to detect forgeries. The client is not liable for signatures obtained "at gun point." No transactions are accepted without a signature and a signature check. The most important of these assumptions is the last. It means that account numbers are worthless to a third party who cannot forge a signature.

Foundations for GUMP

The ability to avoid the cryptographic, infrastructural, and engineering complexities that follow from attempting to hide numbers from others in business transacted over the Internet or other public network is an important aspect of GUMP. This feature of the protocol is most easily achieved if the numbers have no value. For example, a person's credit card number is valuable to another party only if the number is improperly used to buy things without a signature by a mail order placed over the telephone. If a digital signature and signature check were required on every credit card transaction, then the card number alone would have no value.

Of course, there are other good reasons to keep a credit card number secret. Forgery of the signature of the credit card holder might be attempted by another person, or the bank might fail to check the signature, might not require the merchant to pass signed draft slips back for signature check, and make other errors of omission that would enable the forger to successfully complete an improper credit card purchase. However, none of these potential hazards can occur if a digital signature is required and checked for each transaction. It is mathematically unfeasible for anyone to forge a digital signature, and the authenticity of digital signatures may be checked at low cost by anyone, not just a financial institution.

This last point is another fundamental difference between paper-and-ink signatures and digital signatures. The financial institution must keep the SOF secure against substitution or disclosure, so the institution becomes a central bottleneck for conventional signature checking. Since it is not feasible to check every transaction at the institution, various ways of bypassing the check against the SOF are frequently employed in transactions. For example, a credit card may include a tamper-resistant signature block on the back, and merchants are supposed to check the signature on it against that on the signed draft. Essentially, in this case, the cardholder's bank delegates the signature check to the merchant at the risk of the signature on the card being modified. However, in the case of public-key digital signatures, anyone who trusts a given Certificate Authority (CA) root key can perform foolproof verification of a digital signature. These principles underlie the design of the Visa/MasterCard Secure Electronic Transaction (SET) protocol, which is specifically tailored for encrypted credit card transactions between a consumer, an untrusted merchant, and a trusted gateway. Unlike SET, GUMP assumes a generic, two-party transaction, where no valuable account number is required, and authentication rather than encryption insures integrity. While not appropriate for credit card transactions in which the consumer-merchant relationship is spontaneous and transient, GUMP is applicable to the large class of financial transactions that depend on an ongoing relationship with a client; for example, between a customer and his bank.

The following GUMP protocol examples are intended to be electronic equivalents of transactions commonly carried out by banks in the non-electronic world. The present invention incorporates the use of a unique, but not secret number, in every signed transaction.

GUMP Registration Meta-Protocol

The Internet analog of an SOF is a Certified Public Signature Key (CPSK). The GUMP Registration Meta-Protocol (GRMP) is a framework for designing and implementing a financial institution's certification policies to produce a client's CPSK, packaged as a GUMP Relationship Certificate (GRC). The GRC, of course, is public information that can be sent with transaction packets, stored in online directories, and cached on distributed machines without concern that it might be accessed by unauthorized parties.

The GRMP framework includes the following steps:
1. APPLY: The client applies for a certificate either in person or through the financial institution's web site.
2. IDENTIFY: The client provides satisfactory proof of identity to the official of the institution. GUMP allows maximal freedom for policy choices by the institution as to what will constitute satisfactory proof:
   2.1. In the case of face-to-face certification, identification might be showing government documents, as in the traditional protocol.
   2.2. In the case of electronic identification, the institution might require a signature on a challenge with a verification key from a generic identity certificate, such as one from VeriSign Inc., or the U.S. Postal Service.
3. KEY (optional step): The official of the institution gives the client a one-time secret (OTS) out-of-band, for example, in a PIN mailer. In one preferred embodiment, the OTS is the hash of all the account numbers that will be serviced by the GRC. This proposal allows the institution and client to check one another, since each can independently compute the hash. However, the exact form of the OTS is not very important. From the protocol standpoint, it must simply be unique to the institution issuing it. From a system design standpoint, it will most likely be an index key that the institution will use to look up client information. This step can be skipped, as a matter of policy, if the client is separately authenticated as in step 2.2; the institution may simply issue the OTS in the GRC in step 5, below.
4. REQUEST: This is the first step that is always online. The client digitally signs and submits a Request for Certification (RFCert), which contains a proposed public signature key, and securely proves possession of the OTS via the TLS shared-key authentication protocol, e.g., RSA Laboratories Public Key Cryptography Standards PKCS#10 or other suitable form. The public key portion of the digital signature, at this point, proves only that the client controls the as-yet-uncertified private signature key.
5. ISSUE: The institution digitally signs and sends back a GRC binding the client's public signature key to the OTS. From this point on, the OTS is no longer secret; it is simply a public attribute, certified by the institution, of the client's public signature key. It is for this reason that the OTS is called the unsecret. An unauthorized third party cannot use the OTS without also having access to the client's private signature key, which is made as difficult as possible.

The GRC is the analog of the SOF. The financial institution accepts no transactions without a digital signature, which an official of the financial institution (or its computer program) can compare against the SOF.

It is noted that step 3 is the part of GUMP that requires significant modification of standard, off-the-shelf technology. The proposed modification of TLS can be used not only for the GUMP unsecret, but much more broadly for passwords, PINs and other secrets. These modifications avoid sending passwords, PINs, or other secret authentication data over weakly encrypted channels, like those approved for export from the U.S. (i.e., limited to 40 bit encryption keys). Instead, a quantity or number is passed that any party possessing the shared secret can recompute, but that no one else can. The quantity is essentially the hash of the shared secret, though other data linking the quantity to the current session and to established names of both parties is included in the hash. Details of TLS are presented in greater detail below.

Mutual Authentication without Secrecy:

One innovation of the present invention is the unsecret number, which ties the public key in the GRC to all client relationships with the financial institution. The number is useless to anyone who does not control the client's private key. As explained in great detail below, encryption of this number is not needed so long as all transactions are digitally signed. Before certification is granted, the client must satisfy the financial institution's certification policy. After certification, the client satisfies GUMP's authentication policy, which is simply to digitally sign a transaction instrument containing a freshness challenge, proving current control of the private signature key corresponding to the public key in the GRC. This public key is bound to the unsecret by the financial institution's signature on the relationship certificate.

Cryptographically, the public key alone is a perfectly good "unsecret." However, the whole exercise of hashing account numbers is to give the client and the financial institution a non-random number that they can independently control, and to reduce the unsecret to 20 bytes or less. The unsecret might be a number identifying a user or group and denoting access permissions. More likely, it will be a primary database key, so some thousand-odd bits of a composite big number would not be helpful in this regard. To be fair, the substitution of any agreed-upon datum could make an equally good unsecret.

Identity and Relationship Certificates:

SSL version 3.0 includes both server and client authentication. A browser client routinely authenticates a server as a part of the Server "Hello." With version 3.0, the server may require the client to sign a challenge and present a certified public signature key that verifies the signature on the challenge. Typically, to use this feature, the client obtains an identity certificate from a commercial or government certificate authority, such as VeriSign Inc. or the federal Postal Service, and stores it in a convenient place, like a browser database or a directory service. The financial institution certification policy (in steps 2 and 4 above) may accept the identity certificate in place of the traditional documents in person. A relationship certificate binding the client's public signature key to the unsecret is issued to provide local control of names. If the financial institution were to rely on someone else's identification and naming conventions to conduct its business or index its databases, it must internalize or map those naming conventions to its own legacy systems. If, however, the institution issues its own certificates, then it can bind the client's public key to the most convenient identifier. The unsecret does not need to be globally unique; it does not need to be checked by anyone else; it does not have any external requirements whatsoever. It is simply the institution's own local "name" for the client.

The GUMP relationship certificate is thus a proxy for a business relationship that can be resolved to a single party and any number of accounts accessed by that party.

GUMP Transaction Meta Protocol:

Transactions in GUMP are simple and freely configurable. A client may conduct a GUMP transaction with any entity that trusts the root key of the GRC signature chain. In the following example, that entity is referred to as a "merchant." It may be an institution or any number of delegates or associates who trust a signature verification chain that includes the GRC and its associated digital signature keys.

The client and the merchant may conduct arbitrary negotiations prior to the client's signing a transaction instrument (TI). Also, the client and the merchant may authenticate each other via SSL/TLS. The merchant may request the GRC rather than the identity certificate, because the financial institution either issued or understands the unsecret number. However, GUMP does not require SSL/TLS client authority nor that client authority, if used, employ the GRC rather than the identity certificate.

When negotiations are closed and the client is ready to commit the transaction, GUMP requires the client to construct an instrument digitally signed with the (private half of the) client key, and to embed the digitally signed instrument with a valid GRC that the merchant trusts into the SSL/TLS stream. Embedded S/MIME might be a suitable format for such an embedded data capsule. However, encryption may be avoided because it is not needed for GUMP and it is already provided by SSL/TLS. Also, embedded encryption may create International Trafficking in Arms Regulations (ITAR) product export clearance problems. One reason for an embedded and signed instrument is that TLS mutual authentication does not provide the merchant with a permanent, non-repudiatable record of client commitment.

GUMP requires only that the instrument be replay proof, meaning that it contains a secure timestamp, a unique transaction identifier, or a large (128 bit, at least) random freshness challenge that the client signs. It is a good idea for a transaction instrument to contain all three replay protections. Otherwise, structure and content of the instrument are not restricted.

GUMP Delegation Protocol: Memberships

In the prior art, the Secure Electronic Transaction (SET) standard was developed to enable credit card transactions on the Internet. The SET model assumes that a buyer and a merchant prefer to remain anonymous and that a virtual session between the client (buyer) and the merchant's bank is necessary to protect the credit card number from malicious misuse by the merchant.

While this degree of caution is appropriate for the Internet in general and especially for transactions where the card number alone can be used in fraudulent, unsigned, no-card-present transactions, there exists a different category of transactions where the parties know each other or have an ongoing business relationship. Examples include business-to-business purchasing, interactions between air travelers and airlines in frequent flier programs, and between members and sports clubs. The common thread is that there is a contract—"of sorts" or even a formal contract—between the business partners that explicitly lays out the rules. For example, a club member may authorize the club to do something on a case-by-case basis. Another example might be that Alice authorizes Bob to send her company the goods described on her purchase order—but only upon Bob's presenting her with a detailed invoice. The purchase is completed only when Alice signs and returns the invoice, acknowledging the terms of sale and completing the commitment to buy.

The relationship between Alice and Bob has the following characteristics:

1. They trust each other, or, at least they did once when they created their shared unsecret, meaning they have already shared a secret.
2. Because Bob already possesses Alice's secret, he can use it on her behalf without having her share it again; but,
3. The contract between them requires that Bob get Alice's (digitally signed!) permission each time that a transaction occurs.

The essence of the matter is that Bob can negotiate for Alice, but only Alice can commit. So, Bob may have a GUMP Delegation Certificate (GDC) that binds his public key to Alice's unsecret, and Bob may use the GDC to establish mutually authenticated TLS negotiation sessions with Alice and others. But only Alice can sign a transaction instrument with her GRC.

The GDC may simply be a certificate issued by Alice for Bob, containing her unsecret, his public key, and verifiable with her GRC. Expediency mitigates toward every client being a CA of sorts. GUMP—in pure meta form or in some concrete application—can be very easily implemented on top of the Simple Distributed Security Infrastructure (SDSI).

In terms of the GUMP protocol, requesting and granting permission adds another step—but also has the advantage of transparently adding a third party to the transaction. The underlying concept is that this trust need not be transitive. For example, Alice authorizes Bob (whom she trusts) to use her unsecret to negotiate a transaction with Chuck (whom only Bob knows and trusts). Each time he negotiates a deal with Chuck for Alice, Bob must present the permission and Alice must sign it to consummate the deal.

Shared Key Authentication for the TLS Protocol:

High on the list of advantages of standards-based financial protocols is quick and painless deployment. Channel security (TLS) is quickly becoming a requisite for business on the Internet. The only change required to use all of the GUMP protocols is shared-key authentication, and this step is already likely destined to become a part of the TLS standard. Better yet, secure-channel protocols and application program interfaces (APIs) to use them are being bundled with platform components like operating systems and browsers. In most cases, writing security protocols "from scratch" has no payback.

The shared-key authentication mechanism for the TLS protocol is intended to allow TLS clients to authenticate using a secret key (such as a password) that is shared with either the server or a third-party authentication service. The security of the secret authentication key is augmented by its integration into the normal SSL/TLS server authentication/key exchange mechanism.

Recent transport-layer security protocols for the Internet, such as SSL versions 2.0 and 3.0 and PCT version 1 have effected challenge-response authentication using strictly public-key (asymmetric) cryptographic methods, with no use of out-of-band shared secrets. This choice has both benefits and drawbacks. The primary benefit is improved security. An asymmetric private key used for authentication is only stored in one location, and the out-of-band identification necessary for public-key certification need only be reliable, not secret (as an out-of-band shared key exchange must be). In addition, the difficult task of out-of-band shared-key exchange in shared-key authentication systems often leads implementers to resort to human-friendly shared keys (manually typed passwords, for instance), which may be vulnerable to discovery by brute force search or "social engineering."

However, shared-key authentication has certain advantages as well, as described below. Precisely because shared keys are often human-remembered passwords or passphrases, they can be transported from (trusted) machine to (trusted) machine with ease—unlike asymmetric private keys, which must be transported using some physical medium, such as a diskette or "smart card," to be available for use on any machine. Shared-key authentication is in very wide use today, and the cost of conversion to its public-key counterpart may not be worth the extra security, to some installations. In contrast, public-key authentication is very new, its associated tools and methods are either untested or non-existent, and experience with possible implementation or operation pitfalls simply doesn't exist.

These reasons are particularly relevant when individual human users of a service are being authenticated over the Internet, and as a result, virtually all authentication of (human) clients of such services is currently performed using shared passwords. Typically, servers implementing one of the aforementioned transport-layer security protocols and needing client authentication simply accept secure (i.e., encrypted and server-authenticated) connections from each client, who then provides a password (or engages in a challenge-response authentication protocol based on a password) over the secure connection to authenticate to the server.

Unfortunately, such "secure" connections are often not secure enough to protect passwords, because of the various international legal restrictions that have been placed on the use of encryption. Obviously, secret keys such as passwords should not be sent over weakly encrypted connections. In fact, even a challenge-response protocol, which never reveals the password, is vulnerable if a poorly chosen, easily guessed password is used; an attacker can obtain the (weakly protected) transcript of the challenge-response protocol, then attempt to guess the password, verifying each guess against the transcript.

However, it is possible to protect even badly-chosen passwords against such attacks by incorporating shared-key authentication into the transport-layer security protocol itself. These protocols already involve the exchange of long keys for message authentication, and those same keys can be used (without the legal restraints associated with encryption) to provide very strong protection for shared-key-based challenge-response authentication, provided that the mechanism used cannot be diverted for use as a strong encryption method. This latter requirement makes it essential that the shared-key-based authentication occur at the protocol level, rather than above it (as is normally the case today), so that the implementation can carefully control use of the long authentication key.

SSL Protocol Additions:

Starting from SSL version 3.0 notation and formats, the following three new HandshakeTypes are added, and included in the Handshake message definition:

shared_keys(30), share_key_request(31), shared_key_verify(32)
A new CipherSuite is also included, to allow the client to signal support for shared-key authentication to the server:
    TLS_AUTH_SHARED_KEY = {x01, x01};
The client's inclusion of this CipherSuite is independent of other listed CipherSuites, and simply indicates to the server the client's support for shared-key authentication.
The SharedKeys message has the following structure:
    struct {
        DistinguishedName auth_services_client<1..65535>;
    } SharedKeys;

This optional message may be sent by the client immediately following the ClientHello message; in fact, if sent, it is actually enclosed within the ClientHello message, immediately following the last defined field of the ClientHello message. (For forward compatibility reasons, the SSL 3.0 ClientHello message is allowed to contain data beyond its defined fields, and because there is no ClientHelloDone message, the server cannot know that an extra message follows the ClientHello unless it is actually included in the ClientHello message itself. A server that does not support shared-key authentication will simply ignore the extra data in the ClientHello message.) Although enclosed within the ClientHello, the SharedKeys message retains the normal structure and headers of a Handshake message.

The SharedKeys message contains a list of distinguished names of authentication services to which the client is willing to authenticate. This list need not be exhaustive; if the server cannot find an acceptable authentication service from the list in the SharedKeys message, then the server is free to reply with a list of acceptable services in a subsequent SharedKeyRequest message.

In cases where pass-through authentication is used, this message allows clients to be able to notify servers in advance of one or more authentication services sharing a key with the client, so that the server need only fetch (or use up) a challenge from a single service for that client. This message may also be useful in non-pass-through situations; for example, the client may share several keys with the server, associated with identities on different systems (corresponding to different "authentication services" residing on the same server).

If a server receives a SharedKeys message, then any subsequent SharedKeyRequest message can contain a single authentication service selected from the client's list. Note that sending a SharedKeys message does not in itself normally reveal significant information about the client's as-yet-unspecified identity or identities. However, if information about the set of authentication services supported by a particular client is at all sensitive, then the client should not send this message.

The SharedKeyRequest message has the following structure:
    struct {
        DistinguishedName auth_service_name;
        opaque display_string<0..65535>;
        opaque challenge<0..255>;

-continued

```
    } AuthService;
    struct {
        AuthService auth_services_server<1..65535>;
    } SharedKeyRequest;
```

This optional message may be sent immediately following the server's first set of consecutive messages, which includes the ServerHello and (possibly) the Certificate, CertificateRequest and ServerKeyExchange messages, but before the ServerHelloDone message. The auth_services_server field contains a list of distinguished names of shared-key authentication services by which the client can authenticate. The challenge field accompanying each authentication service name contains an optional extra authentication challenge, in case the server needs to obtain one from an authentication service for pass-through authentication. If none is required, then it would simply be an empty (zero-length) field. Similarly, the display_string field may contain information to be used (displayed to the user, for example) during authentication, if needed; its interpretation is left to the implementation.

The SharedKeyVerify message is sent in response to a SharedKeyRequest message from the server, at the same point at which a CertificateVerify message would be sent in response to a CertificateRequest message. (If both a CertificateRequest and a SharedKeyRequest are sent by the server, then the client may respond with either a CertificateVerify message or a SharedKeyVerify message. Only one of the two messages is ever sent in the same handshake, however.) The SharedKeyVerify message has the following structure:

```
struct {
    AuthService auth_service;
    opaque identity<1..65535>;
    opaque shared_key_response<1..255>;
} SharedKeyVerify;
```

The value of auth_service must be identical to one of the AuthService values on the list in SharedKeyRequest.auth_services_server. If the client does not share a key with any of the authentication services listed in the SharedKeyRequest message (and cannot supply a certificate matching the requirements specified in the accompanying CertificateRequest message, if one was sent), then the client returns a "no certificate" alert message (in its normal place in the protocol).

The format of the identity field is left to the implementation, and must be inferable from the accompanying value of auth_service. The value of shared_key_response is defined as:

```
SharedKeyVerify.shared_key_response
    hash (auth_write_secret+pad_2+
        hash (auth_write_secret + pad_1 + hash
(handshake_messages)
        +
SharedKeyVerify.auth_service.auth_service_name
        +SharedKeyVerify.auth_service.display_string
        +SharedKeyVerify.auth_service.challenge
        +SharedKeyVerify.identity + shared_key))
```

Here "+" denotes concatenation. The hash function used (hash) is taken from the pending cipher specification. The client_auth_write_secret and server_auth_write_secret values are obtained by extending the key_block by CipherSpec.hash_size bytes beyond the server_write_key (or the server_write_IV, if it is derived from key_block as well), and using this extended portion as the client_auth_write_secret value. (Only the client_auth_write_secret is used, since only the client ever sends a SharedKeyVerify message.) The value of handshake_messages is the concatenation of all handshake messages from the first one sent up to (but not including) the shared_key_verify message. The pad_1 and pad_2 values correspond to the ones used for MAC computation in the application_data message. The fields from the SharedKeyVerify message are input with their length prefixes included.

A shared-key-based client authentication may proceed as follows. The client includes the TLS_AUTH_SHARED_KEY CipherSuite in its list of CipherSuites in its ClientHello message. It also may or may not send a SharedKeys message along with the ClientHello message, listing the authentication services with which the client shared a key for authentication purposes. In any event, the server sends a SharedKeyRequest handshake message following the ServerHello and accompanying messages containing a list of names of one or more authentication services; if a SharedKeys message was sent, then this list will contain a single choice from the client's SharedKeys message. The client, on receiving the SharedKeyRequest message, selects an authentication service from the server's list (if more than one is offered) and constructs the appropriate authentication response as described above, sending it back, along with its identity and choice of authentication service, in a SharedKeyVerify handshake message. The server itself also constructs the correct authentication response using the known shared key, and checks it against the one provided by the client. The authentication is successful if the two match exactly. Note that if the shared key is password-based, then it would typically be derived from the password using a one-way cryptographic hash function, rather than being the password itself, so that the original password need not be remembered by anyone but the client.

In some circumstances, it is preferable for shared keys to be stored in one place (a central, well-protected site, for instance), while servers that actually communicate with clients are elsewhere (possibly widely distributed, but maintaining secure connections to the central shared-key server). One of the advantages of this shared-key authentication method is that it allows "pass-through" authentication by a third party, if the server accepting the public-key key exchange and the server sharing the key with the client happen to be different. (The use of a separately derived authentication key in the response computation makes this possible.)

Pass-through authentication should be as follows. The server would either collect random challenges in advance from its authentication services, or request them as needed. (If the client sends a SharedKeys message, then the server can select an authentication service from the client's list, and obtain a challenge from that service alone.) Assuming that the client indicates support for shared-key authentication by including the TLS_AUTH_SHARED_KEY CipherSuite in its list, the server would then send a list of one or more authentication services and associated challenges in a SharedKeyRequest message. The client would then select an authentication service (if more than one is offered), compute the correct authentication response using the above proposed formula, and send it to the server in a SharedKeyVerify message.

The server, on receiving a response from a client, would pass it through to the authentication service, along with the values necessary to recalculate it, including: the client_auth_write_key, the hash of all the handshake messages, and the identity field from the certificate verify message. The authentication service would then use the values provided, along with the secret key it shares with the client and the challenge it supplied, to reconstruct the correct value of the response. If this value exactly matches the one provided by the server, then the authentication would succeed; otherwise it would fail.

Further Details of a Preferred Embodiment

Figure 12:
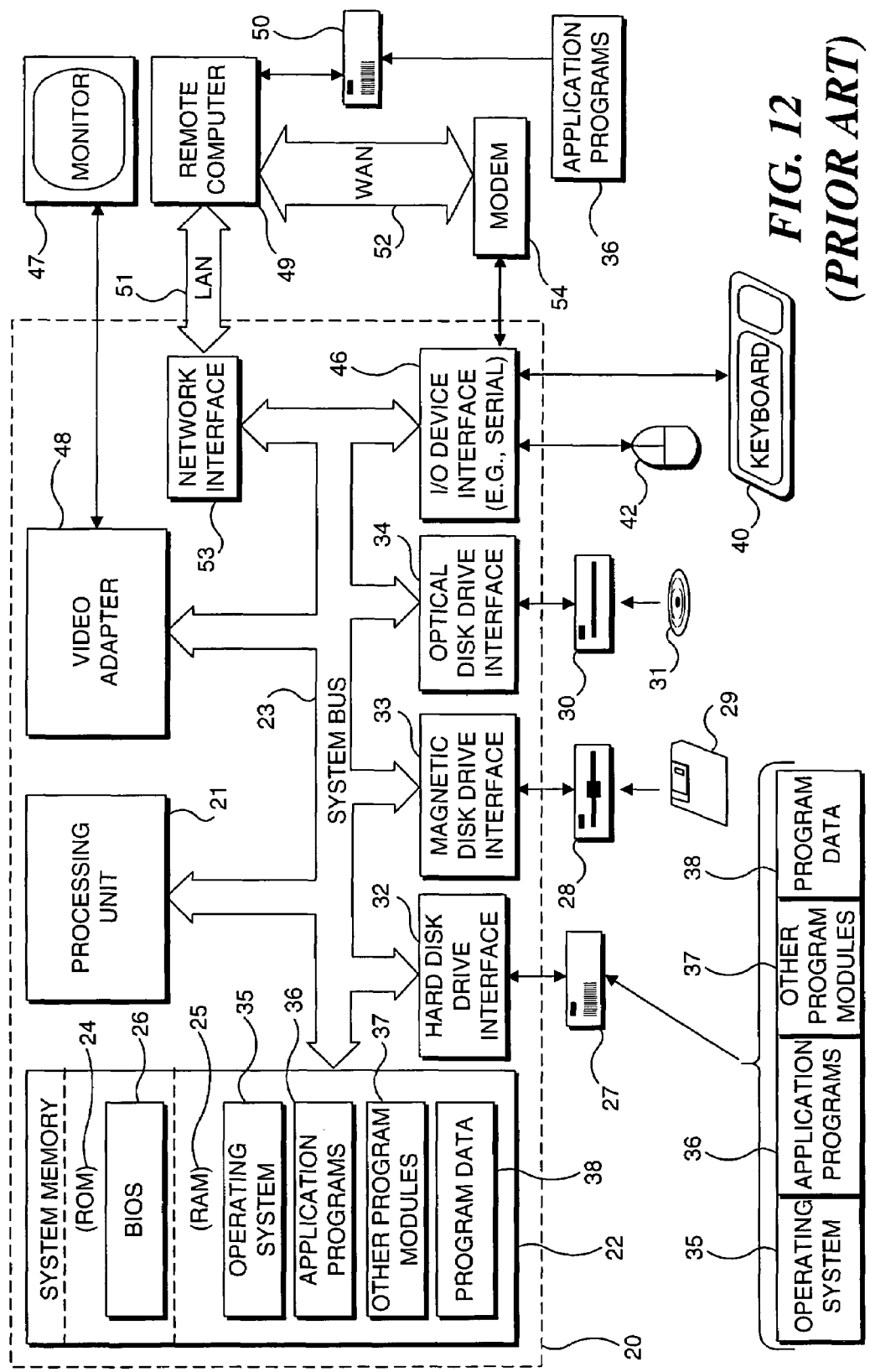
FIG. 12 (Prior Art) is a block diagram of a typical digital computer system suitable for use with a preferred embodiment of the present invention.

FIG. 12 and the following discussion are intended to provide a brief, general description of a suitable computing environment in which the present invention may be implemented. Although not required, the present invention will be described in the general context of computer executable instructions, such as program modules, being executed by a personal computer. Generally, program modules include routines, programs, objects, components, data structures, etc. that perform particular tasks or implement particular abstract data types. Moreover, those skilled in the art will appreciate that this invention may be practiced with other computer system configurations, including hand held devices, multiprocessor systems, microprocessor based or programmable consumer electronic devices, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 12, an exemplary system for implementing the invention includes a general purpose computing device in the form of a conventional personal computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CDROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer readable media provide nonvolatile storage of computer readable machine instructions, data structures, program modules and other data for personal computer 20. Although the exemplary environment described herein employs a hard disk, removable magnetic disk 29, and removable optical disk 31, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, personal computers are often coupled to other peripheral output devices (not shown), such as speakers (through a sound card or other audio interface—not shown) and printers.

Personal computer 20 may operate in a networked environment using logical connections to one or more remote computers, such as a remote computer 49. Remote computer 49 may be another personal computer, a server, a router, a network personal computer, a peer device, or other common network node, and typically includes many or all of the elements described above in connection with personal computer 20, although only an external memory storage device 50 has been illustrated in FIG. 12. The logical connections depicted in FIG. 12 include a local area network (LAN) 51 and a wide area network (WAN) 52. Such networking environments are common in offices, enterprise wide computer networks, intranets and the Internet.

When used in a LAN networking environment, personal computer 20 is connected to LAN 51 through a network interface or adapter 53. When used in a WAN networking environment, personal computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, application programs 36, program modules 37, and program data 38 depicted relative to personal computer 20, or portions thereof, may be stored in external memory storage device 50. It will be appreciated that the network connections shown are exemplary and other means of establishing a communications link between the computers may be used.

Turning now to FIG. 1, an overview 100 is shown of the logic flow implemented by the present invention. Reference is also made in the following description to elements in block diagrams 108, 124, 146, 148, and 174 in FIGS. 3, 5, 7, 9, and 11, respectively. Moving from a start block in FIG. 1, the logic steps to a block 102 in which a client 110 is registered with a financial institution (FI) 112 (shown in FIG. 3). An authorization token, i.e., a GRC 123, is issued by FI 112 to client 110. Optionally, the logic may step to a block 104 and client 110 may enlist a delegate 144 to negotiate the terms of a transaction with a seller 134 (FIG. 5). The logic advances to a block 106 in FIG. 1, and the transaction is completed between seller 134 and client (buyer) 110. The logic flows to an end block when the transaction is completed.

Figure 2:
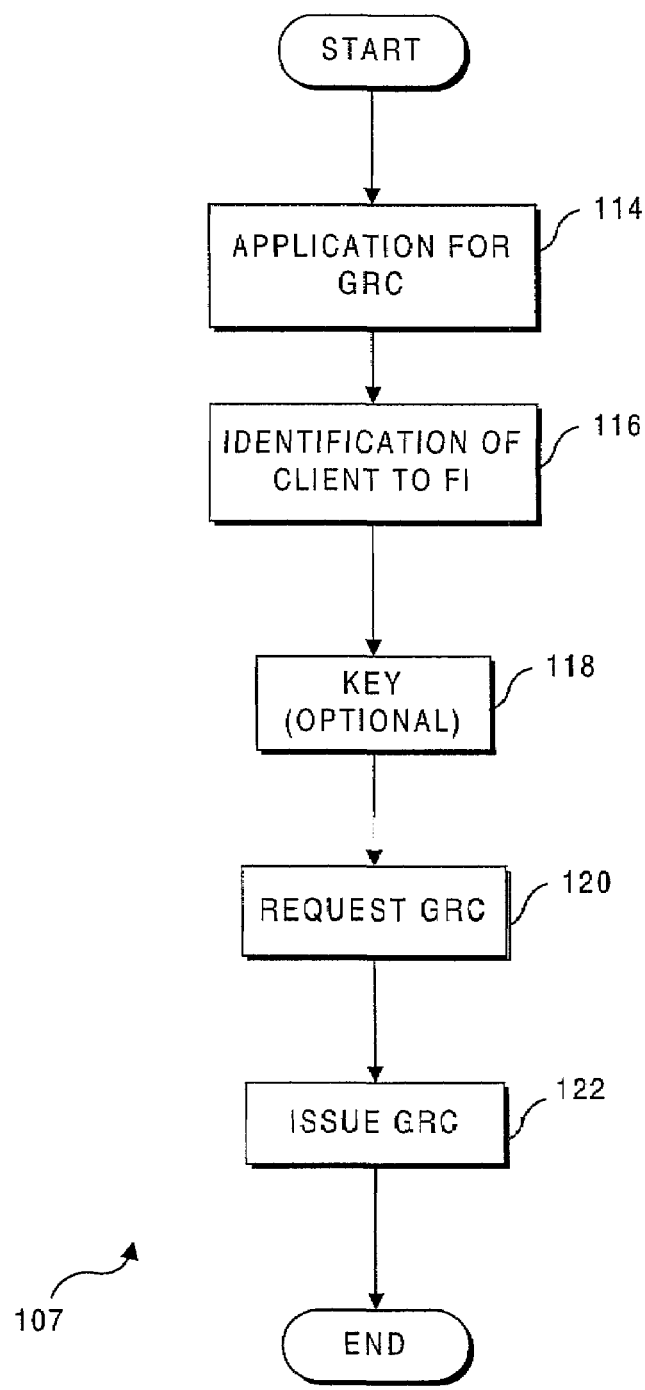
FIG. 2 is a functional block providing an overview of the registration steps in the GUMP transaction.

In FIG. 2, an overview 107 (with references to elements of FIG. 3) depicts the five main steps employed to perform registration indicated in block 102 of FIG. 1. Moving from a start block in FIG. 2, the logic advances to a block 114 and client 110 requests a GRC application 115 from FI 112. The logic steps to a block 116, and client 110 provides identification to FI 112. Optionally, the logic advances to a block 118 and a key, such as a one-time secret (OTS) 117, is shared out of band between client 110 and FI 112. Next, the logic flows to a block 120 and client 110 sends a GRC request 119 to FI 112. The logic moves to a block 122 and FI 112 issues GRC 123 to client 110. Lastly, the logic steps to an end block and terminates.

Digital signatures employ a matched pair of public and private keys. The sender may transform a message using the sender's private key in a special way that may be verified by anyone holding the sender's public key. If the key size is sufficiently large, it is practically impossible to transform a message in precisely this manner unless one has the private key. This concept provides the basis for a "digital signature," for if the transformed message could only have been generated using the sender's public key, the sender must have used his private key and thus been involved in providing the signature for the message. Also, any subsequent modification of the transformed message will invalidate the signature as the transformed message will then be different. The digital signature thus protects the integrity of the data; accidental error or deliberate modifications will be detected. In a preferred embodiment of the present invention, a digital signature protocol is employed for authenticating communications between the various parties.

A hash value is a fixed-size result obtained by applying a specified transformation (the "hash function") to an arbitrary amount of data (the "input data"). A good hash function has the property that any change in the input data can potentially change every bit in the resulting hash value; for this reason hash values are useful in detecting any modification in a large data object. Further, a good hash function has the property that it is computationally infeasible to construct two independent data inputs that have the same hash value. In the preferred embodiment of the present invention, OTS 117 is a hash value derived from the account numbers for financial resources at FI 112 controlled by client 110. In another embodiment, OTS 117 could be a hash value derived from data known to FI 112 that identifies client 110 to the institution. In yet another embodiment, OTS 117 is a hash value derived from knowledge shared between FI 112 and client 110, such as a combination of an account number and a PIN mailer. In another embodiment OTS 117 is any datum agreed upon by client and FI 112, not necessarily a hash value.

Figure 3:
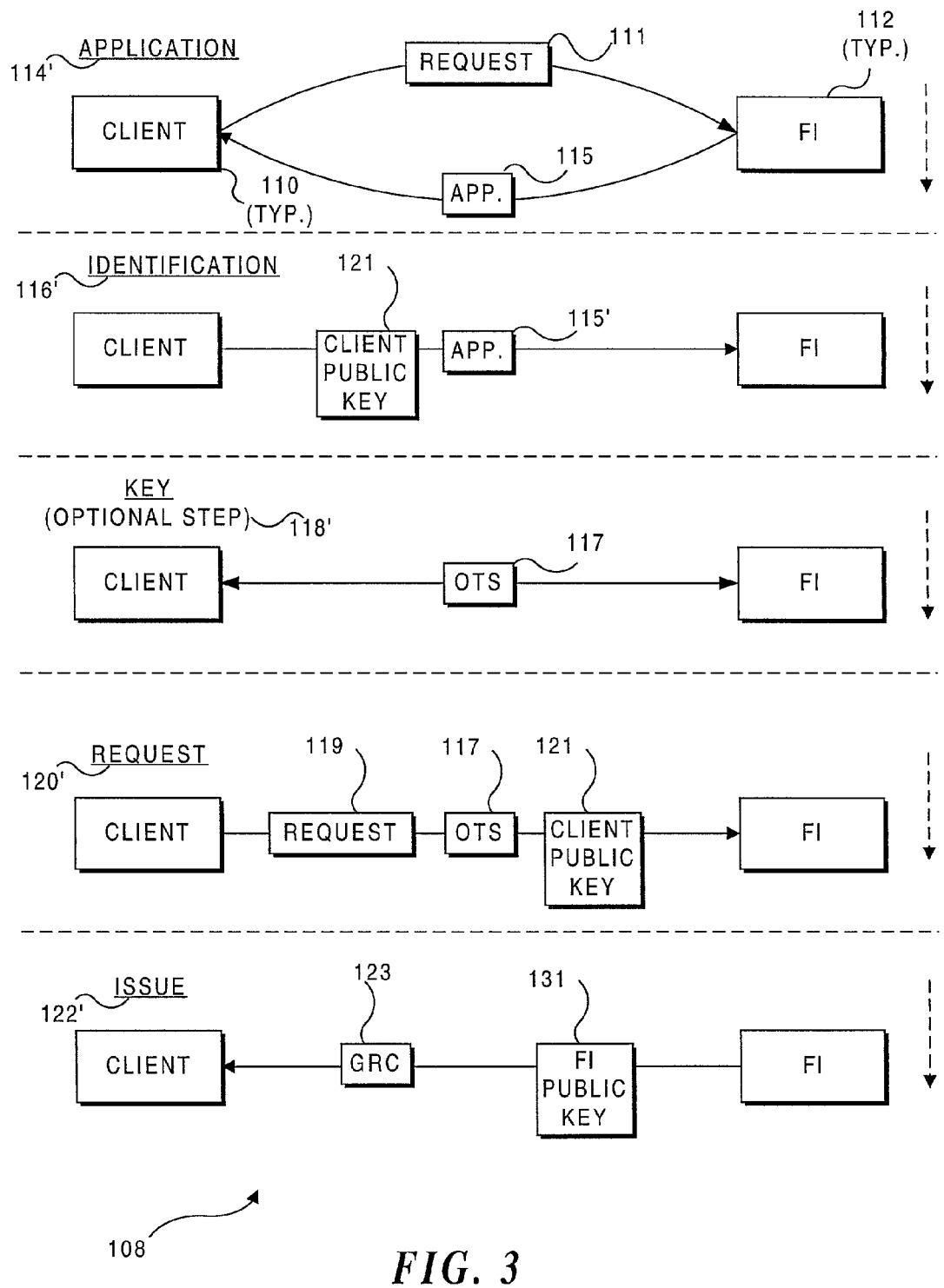
FIG. 3 is a detailed schematic diagram illustrating the registration steps in the GUMP transaction.

Referring now to FIG. 3, schematic block diagram 108 depicts the five steps more generally discussed in FIG. 2. Starting with an application step 114', client 110 sends a GRC application request 111 to FI 112. In response, GRC application 115 is sent from FI 112 to client 110. Moving to an identification step 116', a GRC application 115' is digitally signed by client 110 and sent from the client to FI 112. Further, signed GRC application 115' includes a client public key 121 and may also include at least one certificate associating the digital signature with the identity of client 110. Typically, the certificate is issued by another institution or a registry, which has previously certified that the digital signature is associated with the true identity of client 110.

Optionally, the logic includes a key step 118' so that FI 112 may provide an OTS 117 out of band to client 110. OTS 117 may be the hash value of the FI's accounts or a PIN mailer shared through an out of band communication channel, such as conventional mail.

In any case, the logic advances to request step 120' and GRC request 119 is digitally signed by client 110 and sent from client 110 to FI 112. GRC request 119 may be accompanied by client public key 121 and optional OTS 117.

Next, the logic flows to an issue step 122' and GRC 123 is digitally signed by FI 112 before it is sent from the FI to client 110. GRC 123 may include OTS 117 and client public key 121. Also, an FI public key 131 may be provided with GRC 123. Optionally, OTS 117 may be exchanged between client 110 and FI 112 in issue step 122'. Once client 110 has authenticated GRC 123 with FI public key 131, the logic returns to the main flow of the present invention.

Figure 3A:
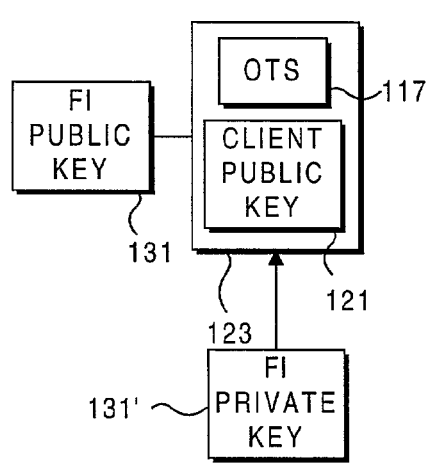
FIG. 3A is a detailed schematic diagram depicting a GUMP relationship certificate.

In FIG. 3A a schematic diagram shows the main elements associated with GRC 123, including client public key 121, FI public key 131, and OTS 117. An FI private key 131' is depicted transforming at least some of the data (OTS 117 and client public key 121) of GRC 123, which may only be verified with FI public key 131. Also, it is envisioned that another embodiment might employ FI private key 131' to only transform OTS 117, client public key 121, or any other portion of GRC 123. In yet another embodiment, FI public key 131 may not be provided with GRC 123. Instead, client 110 could have retained FI public key 131 from a previous transaction or the client might download the FI public key from a network.

Figure 4:
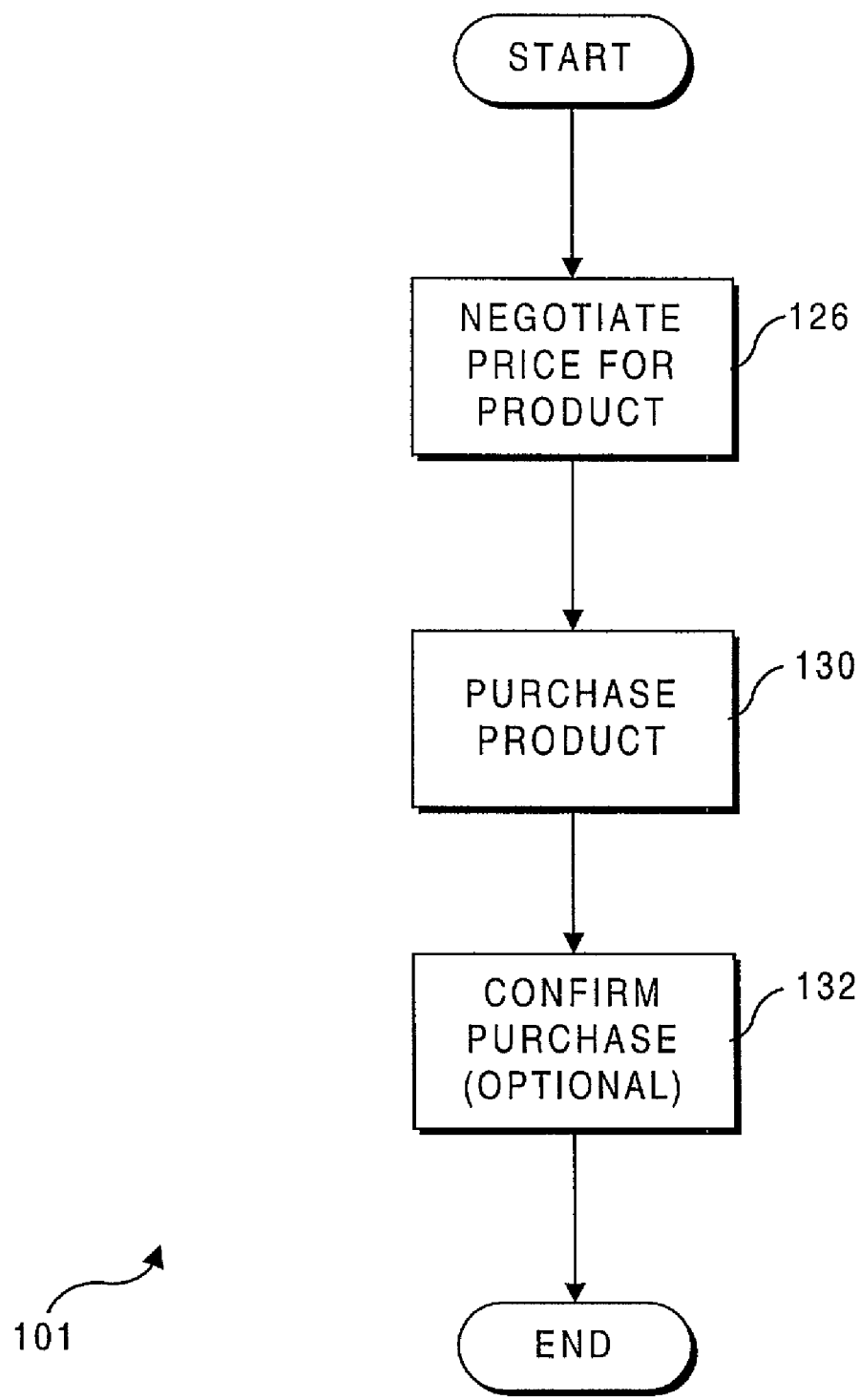
FIG. 4 is a functional block diagram providing an overview of the transaction steps in the GUMP transaction.

In FIG. 4 (with references to elements of FIG. 5), an overview 101 shows the three main steps employed to perform the transaction depicted in block 106 of FIG. 1. Stepping from a start block, the logic moves to a block 126, in which client (buyer) 110 negotiates with seller 112 for the price of the goods to be sold. Next, the logic advances to a block 130 and client 110 purchases the goods from seller 134. Optionally, the seller confirms the purchase of the goods in a block 132. Finally, the logic steps to an end block and returns to the main flow of the present invention.

In FIG. 5, schematic block diagram 124 is provided showing the four main steps to perform the transaction function as depicted in block 106 of FIG. 1 and generally discussed above in regard to FIG. 4. Beginning with a negotiation step 126', GRC 123, FI public key 131 and a request 125 for a cost 127 of the goods is sent from client 110 to seller 134. In response, cost 127 is sent from seller 134 to client 110. Advancing to a purchase step 130', a GRC 123', client public key 121, and FI public key 131 are sent from client 110 to seller 134. GRC 123' is digitally signed by client 110 and it includes cost 127 and GRC 123. GRC 123' may be redeemed for value because it has been digitally signed by both FI 112 and client 110.

In another embodiment, client public key 121 and FI public key 131 may not be provided with GRC 123'. Instead, seller 134 might have retained these public keys from a previous transaction or the seller could download them from a network.

Optionally, the logic flows to a confirmation step 132' and seller 134 sends a transaction instrument (TI) 133, such as a purchase order or bill of lading, to client 110. Upon receipt of TI 133, client 110 confirms the transaction by digitally signing and returning a TI 133' to seller 134. Client 110 also returns client public key 121 along with TI 133'. Although not shown, seller 134 eventually presents GRC 123' to FI 112 for redemption. Before paying seller 134, FI 112 may employ some form of replay detection, such as a challenge, to ensure that GRC 123' has not been reused since it was signed.

Figure 5A:
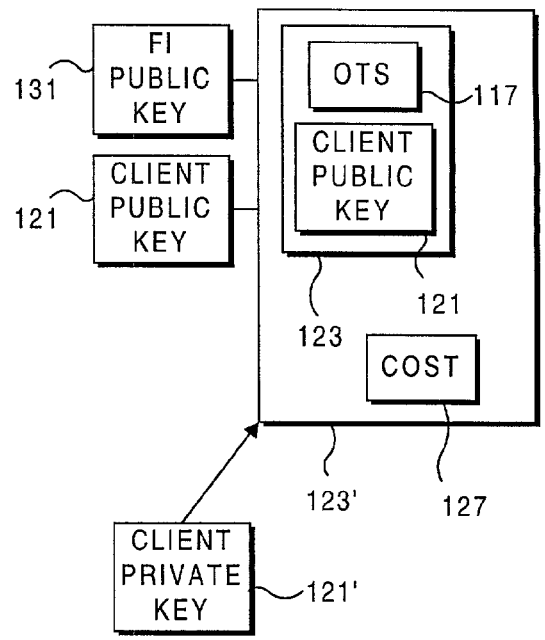
FIG. 5A is a detailed schematic diagram portraying a digitally signed GUMP relationship certificate.
Figure 5:
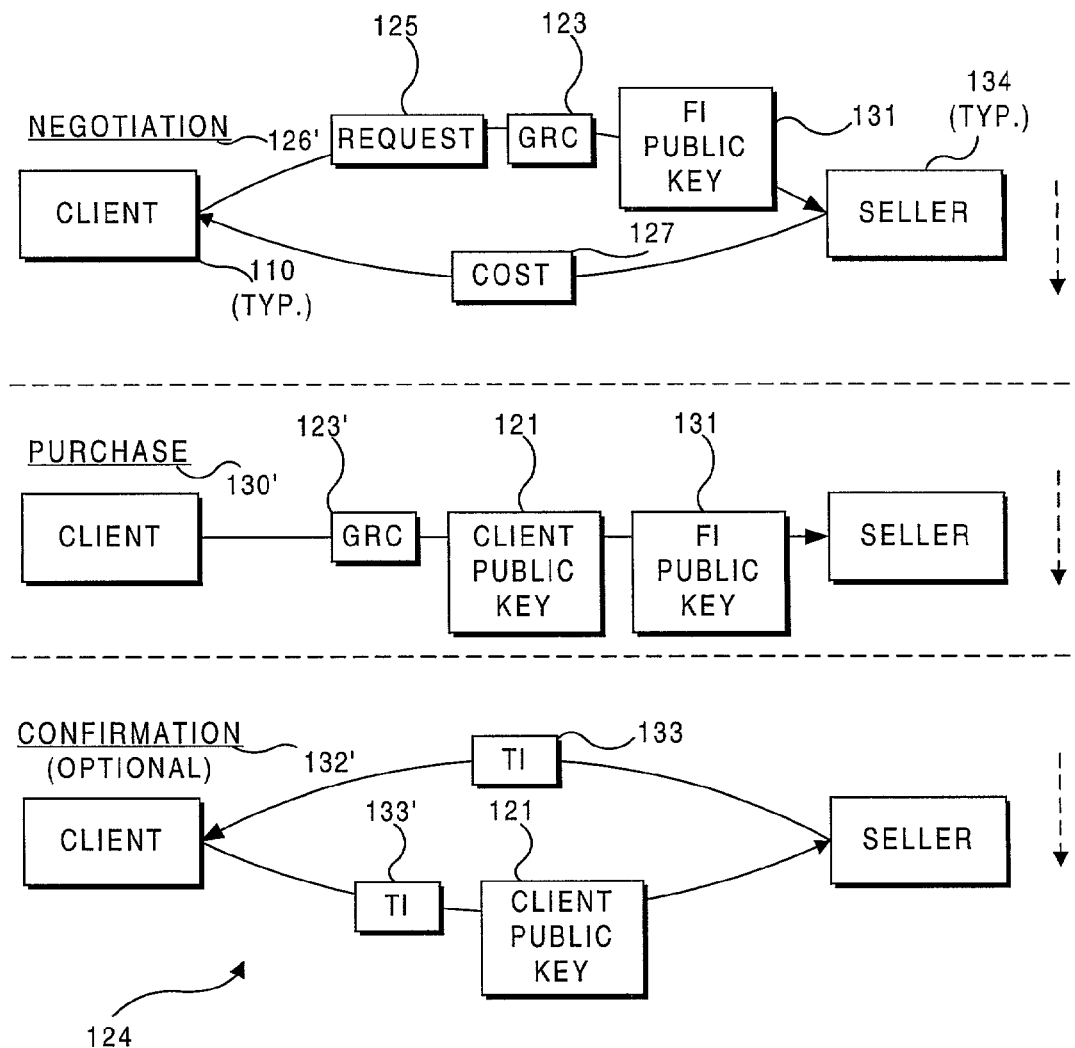
FIG. 5 is a detailed schematic diagram showing the transaction steps in the GUMP transaction.

In FIG. 5A, a schematic diagram shows the main elements associated with GRC 123', including GRC 123 and cost 127. A client private key 121' is depicted digitally signing (transforming) at least some of the data (GRC 123 and cost 127) of GRC 123', which may only be verified with client public key 121. It is also envisioned that another embodiment might produce GRC 123' by only employing client private key 121' to digitally sign a portion of the GRC data.

Figure 6:
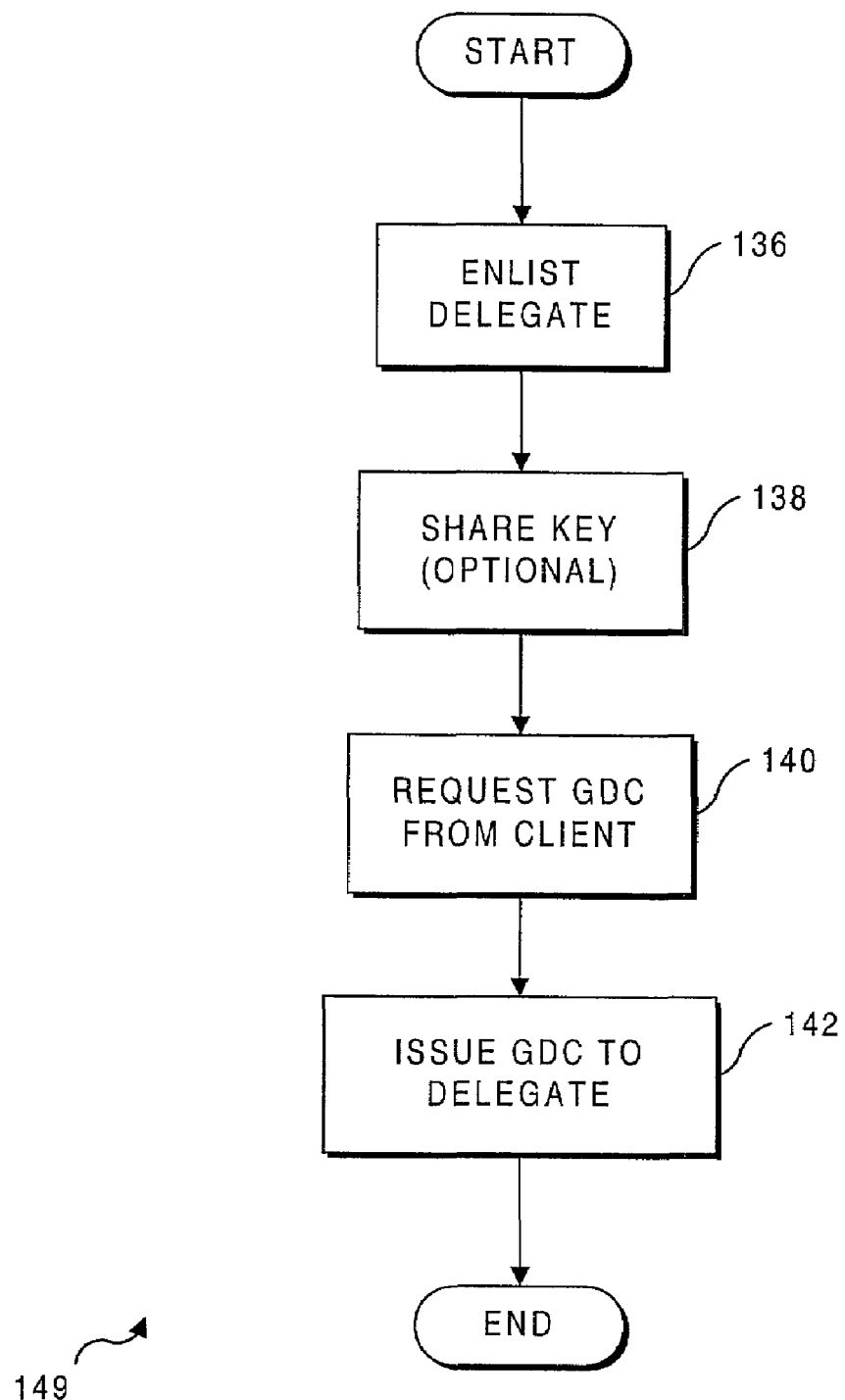
FIG. 6 is a functional block diagram showing an overview of the optional delegation steps in the GUMP transaction.

Turning to FIG. 6 (with references to elements of FIG. 7), an overview 149 illustrates the four main steps employed by the present invention to perform the delegation as depicted in block 104 of FIG. 1. Moving from a start block, the logic advances to a block 136, and client 110 enlists delegate 144 to negotiate the purchase of the goods from seller 134. Optionally, the logic steps to a block 138 and a key, such as an OTS 141, is shared out of band between client 110 and delegate 144. Next, the logic flows to a block 140, in which delegate 144 requests a GUMP Delegation Certificate (GDC) 147 from client 110. The logic advances to a block 142, and client 110 issues GDC 147 to delegate 144. GDC 147 authorizes delegate 144 to represent client 110 in negotiations for the purchase of the goods from seller 134. Lastly, the logic advances to an end block and returns to the main flow of the present invention.

Figure 7A:
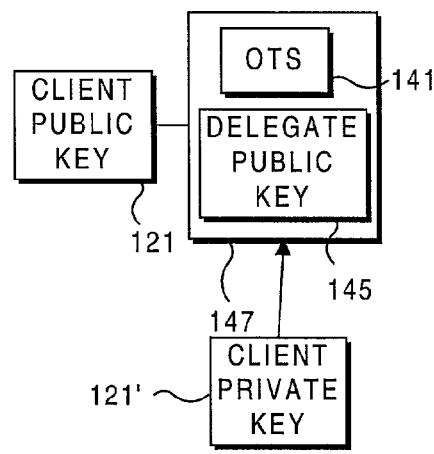
FIG. 7A is a detailed schematic diagram of a GUMP delegation certificate.
Figure 7:
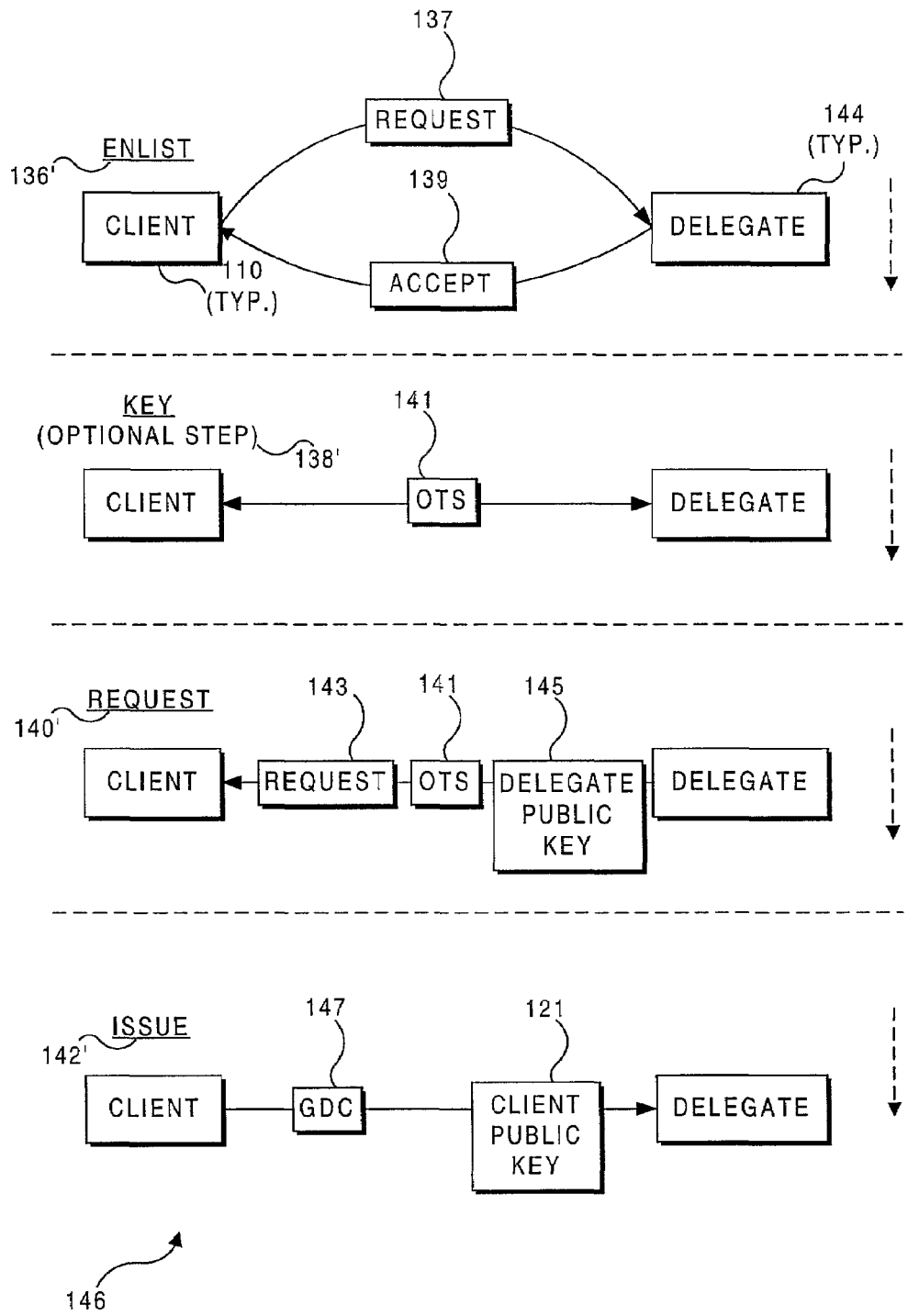
FIG. 7 is a detailed schematic diagram of the optional delegation steps in the GUMP transaction.

In FIG. 7, schematic block diagram 146 is provided of the four main steps generally discussed in FIG. 6 for implementing the functionality of delegation in block 104. Starting at enlist step 136', a request 137 is sent by client 110 to delegate 144. The contents of request 137 ask if delegate 144 will negotiate the purchase of the goods for client 110 from seller 134. If delegate 144 agrees to negotiate, an accept response 139 is sent to client 110. Optionally, the logic advances to a key step 138' and OTS 141 is shared out of band between client 110 and delegate 144.

Next, the logic moves to a request step 140' and delegate 144 sends a digitally signed request 143 to client 110 for GDC 147. Request 143 may include OTS 141 and a delegate public key 145 that enables client 110 to authenticate the request. Further, delegate 144 may provide client 110 with at least one certificate (not shown) that associates the delegate's digital signature with the true identity of the delegate. In an issue step 142', a GDC 147, which is digitally signed by client 110, is sent from the client to delegate 144. Client public key 121 and delegate public key 145 are bound to GDC 147, which may also include OTS 141.

In yet another embodiment, client public key 121 may not be sent with GRC 147 to delegate 144. Instead, delegate 144 might have retained client public key 121 from a previous transaction or the delegate could download the client public key from a network.

In FIG. 7A, a schematic diagram is shown of the main elements associated with GDC 147, including client public key 121, delegate public key 145, and OTS 141. Further, client private key 121' is depicted digitally signing at least some of the data (OTS 141 and delegate public key 145) of GDC 147, which may only be verified with client public key 121. It is also envisioned that another embodiment might produce GDC 147 by employing client private key 121' to only sign OTS 141, delegate public key 145, or some portion of the GDC data.

Figure 8:
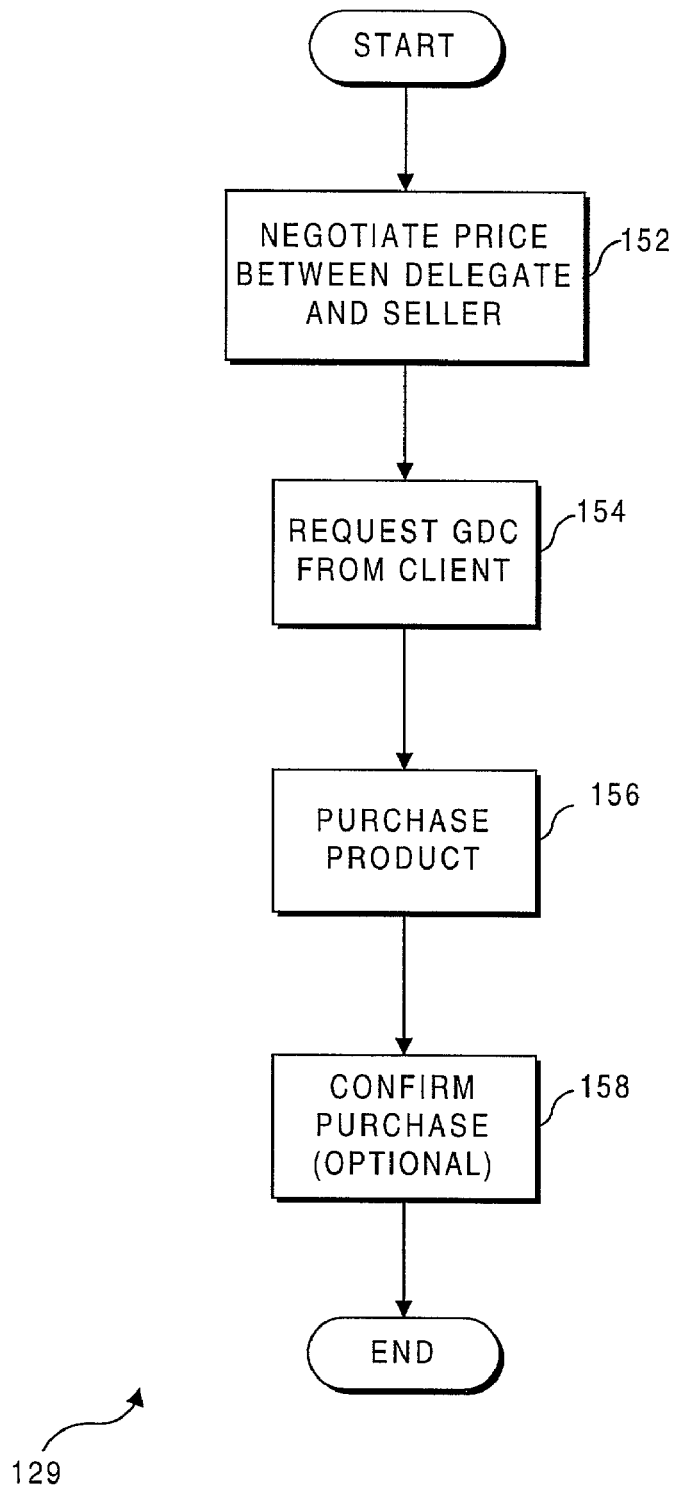
FIG. 8 is a functional block diagram showing an overview of the transaction steps performed by a delegate in the GUMP transaction.

In FIG. 8 (with references to elements of FIG. 9), an overview 129 illustrates the four main steps employed to perform the transaction when client 110 has enlisted delegate 144 to negotiate the purchase of goods from seller 134. Advancing from a start block, the logic steps to a block 152, where delegate 144 negotiates the terms (e.g., price or other conditions) for purchasing goods from seller 134. The logic moves to a block 154, in which delegate 144 requests client 110 to digitally sign and provide a GDC 147' for authorizing the purchase of the goods at the negotiated terms. The logic flows to a block 156, and delegate 144 purchases the goods by sending digitally signed GDC 147' to seller 134. Optionally, the logic moves to a block 158 and seller 134 confirms the purchase of the goods with a transaction instrument (TI) 157. Thereafter, the logic steps to an end block.

Figure 9A:
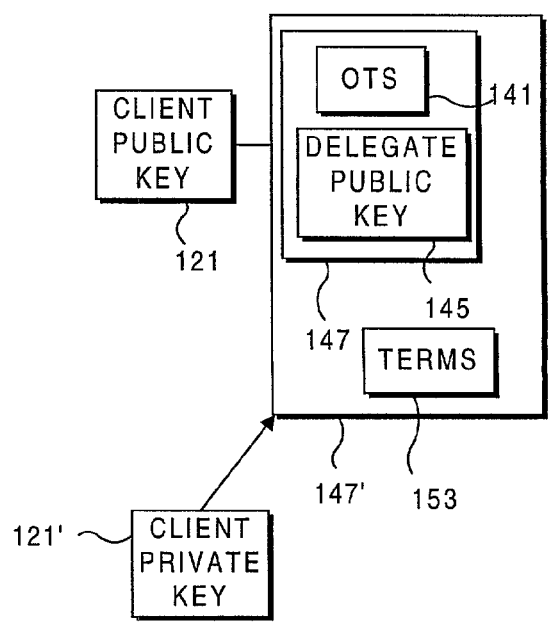
FIG. 9A is a detailed schematic of a digitally signed GUMP delegation certificate.
Figure 9:
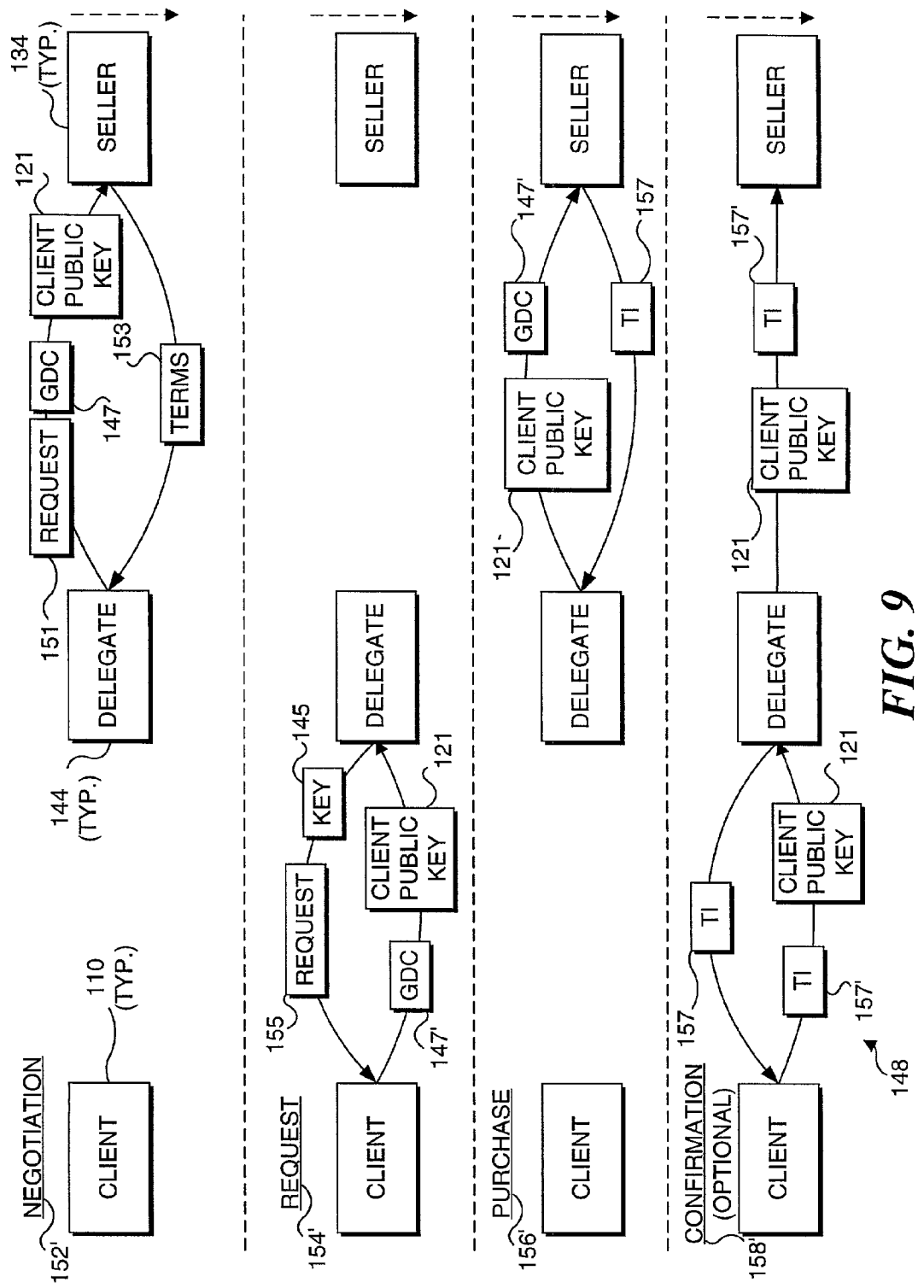
FIG. 9 is a detailed schematic diagram of the transaction steps performed by the delegate in the GUMP transaction.

In FIG. 9, schematic block diagram 148 is provided illustrating the four main steps generally discussed in FIG. 8 for implementing the functionality of block 106 when client 110 has enlisted delegate 144 to negotiate the transaction. In a negotiation step 152', GDC 147, client public key 121, and a request 151 to purchase the goods are sent by delegate 144 to seller 134. Also, at least one other certificate (not shown) may be included that associates the digital signature of GDC 147 with the true identity of client 110. In response, terms 153 (e.g., purchase price and/or other conditions) for the goods are sent by seller 134 to delegate 144. The logic flows to a request step 154'. A request 155 is made and signed by delegate 144 for client 110 to send GDC 147', which is digitally signed by client 110 and may include GRC 147 and terms 153. Also, delegate public key 145 may be sent along with request 155 for authenticating the request. Further, delegate public key 145 may have been retained from a previous transaction or downloaded from a network. If client 110 approves terms 153, the client sends GDC 147' to delegate 144. Client 110 may also provide client public key 121 along with GDC 147'. It is important to note that GDC 147' must have two digital signatures from client 110 before it may be used by delegate 144 to complete the purchase of the goods. The first digital signature must authorize delegate 144 to negotiate the terms of the transaction for the client and the second digital signature must authorize the consummation of the transaction.

Next, the logic moves to a purchase step 156' and delegate 144 sends twice signed GDC 147' and client public key 121 to seller 134 for the goods at negotiated terms 153. Seller 134 sends TI 157 to delegate 144 for confirming the purchase of the goods.

Optionally, the logic will advance to a confirmation step 158' and delegate 144 will send TI 157 to client 110 for the client's digital signature. To confirm that the purchase is authorized, client 110 will digitally sign TI 157' and send it back to delegate 144, along with client public key 121. Delegate 144 forwards TI 157', along with client public key 121, to seller 134. In this case, the goods are typically delivered by seller 134 to client 110 after TI 157' has been received.

In another embodiment, client public key 121 may not be provided with GRC 147' or TI 157'. Instead, delegate 144 and/or seller 134 might have retained this public key from a previous transaction or downloaded it from a network.

In FIG. 9A, a schematic block diagram is shown of the main elements of GDC 147', including client public key 121 and GDC 147. Client private key 121' is depicted as being used for digitally signing at least some of the data (GRC 147 and terms 153) of GDC 147', which may only be verified with client public key 121.

Figure 10:
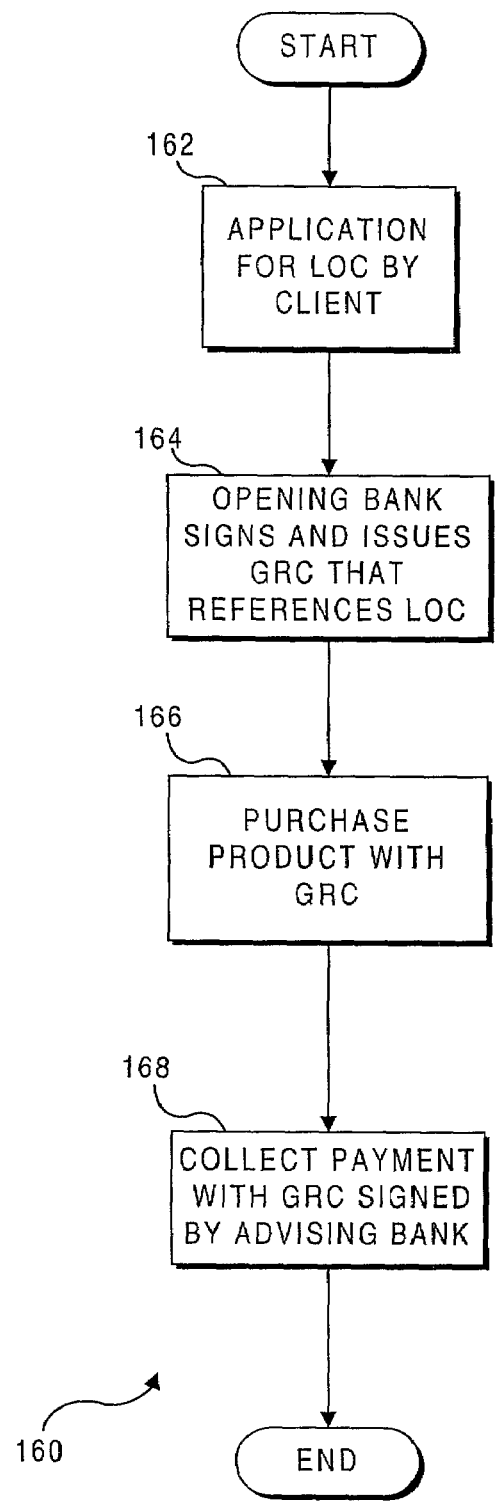
FIG. 10 is a functional block diagram providing an overview of the steps employed to use a Letter of Credit (LOC) in the GUMP transaction.

Turning now to FIG. 10 (with references to elements of FIG. 11), an overview 160 depicts the four main steps employed by the present invention to purchase products with a financial document, such as a Letter of Credit (LOC) 175. Moving from a start block, the logic flows to a block 162 and client 110 (buyer) applies to an opening bank 170 for a GRC 163 that includes LOC 175 for the purchase of goods 169. LOC 175 indicates terms (purchase price and/or conditions) that have been previously negotiated with seller 134.

Advancing to a block 164, GRC 163 is sent by opening bank 170 to both client 110 and seller 134. Next, the logic steps to a block 166 in which the seller ships the goods to client 110. Also, seller 134 makes a showing to an advising bank 172 that the negotiated terms of LOC 175 have been met, e.g., the goods have shipped to client 110. Advising bank 172 is associated with the financial resources of seller 134. The logic moves to block 168 and advising bank 172 digitally signs a GRC 163' before sending it to opening bank 170 for a payment 173. Upon receipt of GRC 163', opening bank 170 sends payment 173 to advising bank 172. It is important to note that opening bank 170 and advising bank 172 perform as quasi-referees to ensure that the negotiated terms of LOC 175 are met. Finally, the logic steps to an end block and the transaction is complete.

Figure 11:
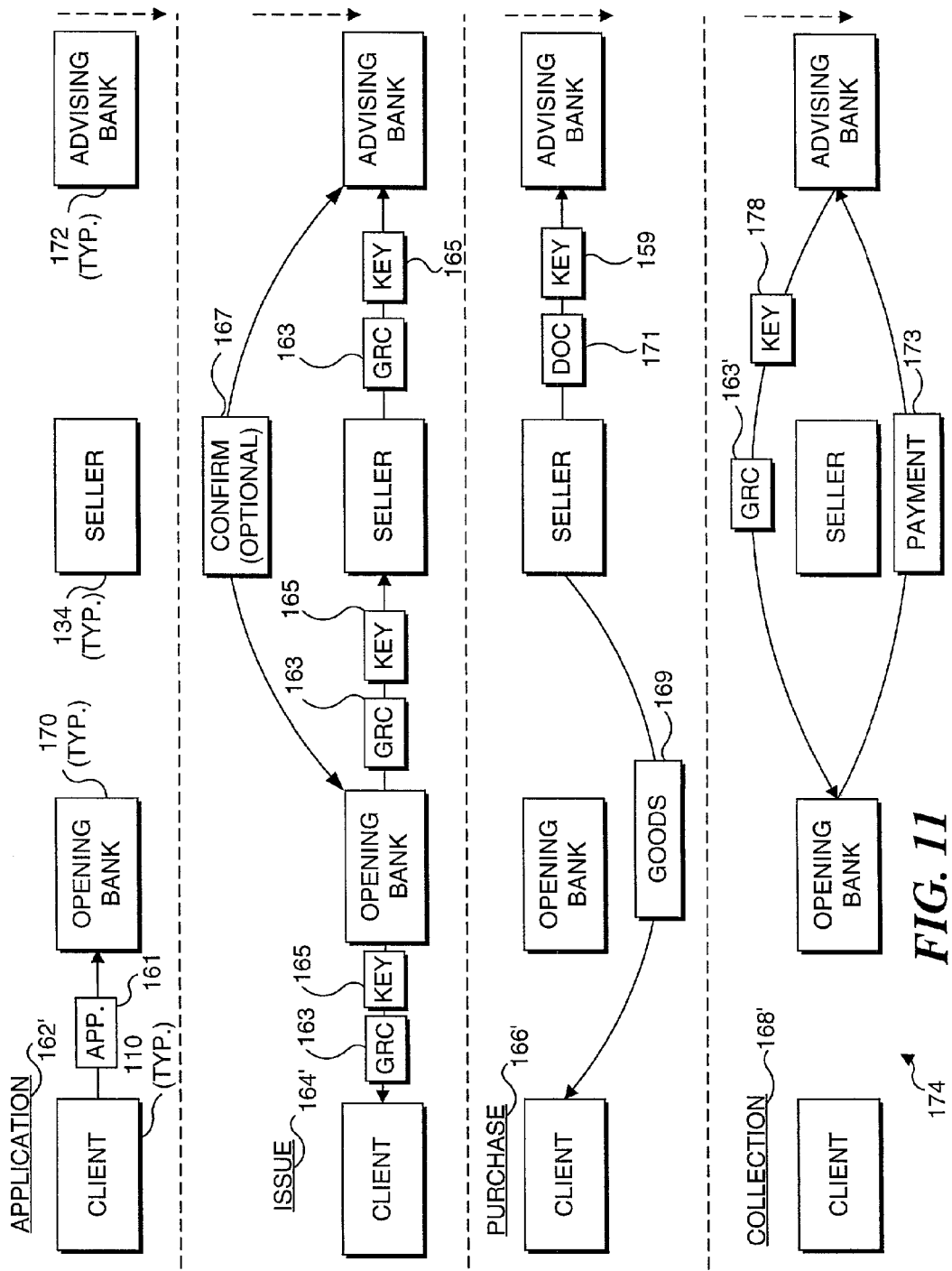
FIG. 11 is a detailed schematic diagram of the steps used to employ the LOC in the GUMP transaction.

In FIG. 11, schematic block diagram 174 depicts the four main steps generally presented in FIG. 10 for implementing the present invention to purchase goods with a financial document (LOC 175). In an application step 162', client 110 sends an application 161 for GRC 163 to opening bank 170.

Next, in an issue step 164', GRC 163 and an opening public key 165 are sent by opening bank 170 to client 110. GRC 163 is digitally signed by opening bank 170 and may include client public key 121, LOC 175, and an optional OTS 176 (not shown) that was previously exchanged out of band between opening bank 170 and client 110. Opening bank 170 also provides to seller 134 opening public key 165 and another GRC 163. Seller 134 forwards GRC 163 and opening public key 165 to advising bank 172. Optionally, advising bank 172 may verify the authenticity of GRC 163 by exchanging a confirmation 167 with opening bank 170 through another communication channel, such as a secure financial transaction network.

In a purchase step 166', seller 134 sends goods 169 to client 110. Seller 134 sends a digitally signed document 171 and a seller public key 159 to advising bank 172. Document 171 provides a showing, such as a bill of lading, that terms in LOC 175 for seller 134 have been met. In a collection step 168', a GRC 163' is digitally signed by advising bank 172 and the signed GRC is sent along with an advising public key 178 to opening bank 170. GRC 163' includes the digital signatures of both opening bank 170 and advising bank 172. It is important to note that the digital signatures of both advising bank 172 (associated with the seller) and opening bank 170 (associated with the client) are required before GRC 163' may be redeemed for payment 173. Also, the digital signature of advising bank 172 guarantees to opening bank 170 that the terms in LOC 175 for seller 134 have been or will be met. Upon receipt of GRC 163', opening bank 170 sends payment 173 to advising bank 172 for dispersal to seller 134 and the transaction is complete. Additionally, it is envisioned that substantially the same steps for the LOC transaction could be employed for other documents of commerce, such as contracts for goods.

In another embodiment, opening public key 165 may not be provided with GRC 163. Instead, advising bank 172 might have retained opening public key 165 from a previous transaction or the advising bank could download the opening public key from a network. Similarly, advising public key 178 may not be provided with GRC 163'. Instead, opening bank 170 might retain advising public key 178 from a previous transaction or the opening bank could download it from a network.

It is further envisioned that another embodiment (not shown) of the present invention would enable the terms of LOC 175 to identify a beneficiary (recipient of payment for goods) that is different from seller 134. In this case, the advising bank might be associated with the beneficiary, so that payment 173 would be dispersed directly to the beneficiary when the terms of LOC 175 have been met by seller 134.

Figure 11A:
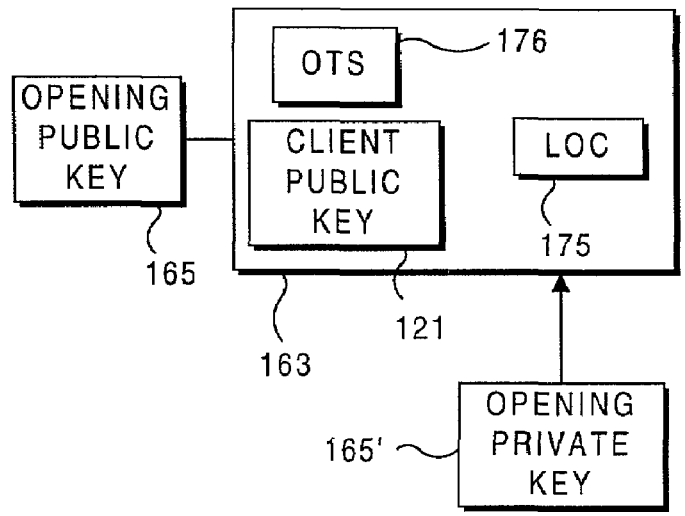
FIG. 11A is a detailed schematic of a GRC that references the LOC.

In FIG. 11A, a schematic diagram is shown of the main elements associated with GRC 163, including opening public key 165, client public key 121, LOC 175, and OTS 176. Also, opening private key 165' is depicted digitally signing at least some of the data (client public key 121, OTS 176, and LOC 175) for GRC 163, which may only be verified with opening public key 165. It is also envisioned that another embodiment might produce GDC 163 by only employing opening private key 165' to digitally sign OTS 176, LOC 175, client public key 121, or any other part of the GDC.

Figure 11B:
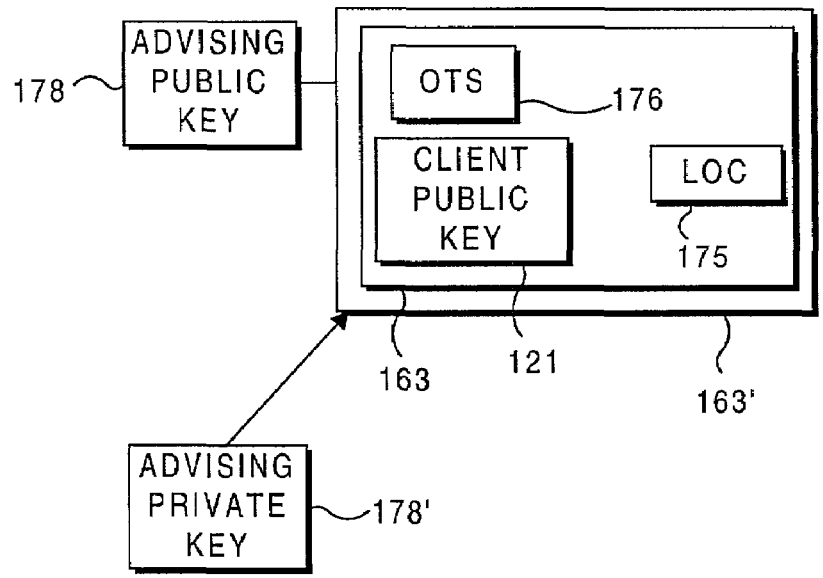
FIG. 11B is a detailed schematic of a digitally signed GRC that references the LOC.

In FIG. 11B, a schematic diagram is shown of the main elements associated with GRC 163', including advising public key 178 and GRC 163. Also, an advising private key 178' is depicted digitally signing at least some of the data (GRC 163) of GRC 163'. The signed data may only be verified with advising public key 178.

Another embodiment of the present invention could enable a non-financial institution to issue a GRC. For example, a shoppers club could issue a GRC to a member for purchasing goods at the club. The shoppers club GRC leverages the concept that most transactions may be divided into a series of two-party transactions between trusted trading partners, e.g., a merchant and a repeat customer.

In yet another embodiment, a service provider could issue a GRC that certifies a customer relationship without revealing the true identity of the customer. The GRC would enable the customer to anonymously prove the existence of the service to another party. If the other party wanted to know the customer's identity, it would have to ask the service provider for this information. The ability to control the access of other parties to the identity of the customer could be advantageous in a highly competitive market, such as long distance telephone service.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for performing an electronic commerce transaction over an unsecure network without requiring encryption of all documents communicated over the unsecure network that are employed for performing the electronic commerce transaction, comprising the steps of:
   (a) enabling a first party to apply for registration with a second party in order to receive a commercial relationship certificate, the first party having access to financial resources through the second party;
   (b) presenting a certified identifier of the first party to the second party, said certified identifier enabling the second party to confirm a true identity of the first party;
   (c) transferring the commercial relationship certificate to the first party from the second party over the unsecure network, the commercial relationship certificate being digitally signed by the second party and including the certified identifier and an index to the financial resources accessible to the first party through the second party, neither said commercial relationship certificate nor said index being encrypted or secret;

(d) providing the commercial relationship certificate to a seller over the unsecure network, the commercial relationship certificate being digitally signed by the first party to indicate that the first party agrees to make a payment for goods provided by the seller in an amount indicated in the certificate as digitally signed; and (e) said seller presenting the commercial relationship certificate that was digitally signed by the first party to the second party over the unsecure network in exchange for the payment, the second party referencing the amount indicated in said commercial relationship certificate in making the payment to the seller from the financial resources accessible by the first party.

2. The method of claim 1, wherein the step of presenting the identifier further comprises the steps of:

(a) determining a one time secret, the one time secret enabling the second party to initially confirm the identity of the first party in association with a public key of a digital signature of the first party that is submitted to the second party by the first party; and (b) said one time secret thereafter becoming an unsecret and serving as the index.

3. The method of claim 2, wherein the one time secret is derived from information shared between the first party and the second party.

4. The method of claim 2, wherein the one time secret is derived from information known only to the second party.

5. The method of claim 2, wherein the digital signature is unique to the first party.

6. The method of claim 2, wherein the unsecret is bound to the public key of the digital signature of the first party in the certificate.

7. The method of claim 2, wherein the unsecret comprises a hash value of reference numbers for the financial resources.

8. The method of claim 2, wherein the unsecret comprises a hash value of data known to the second party.

9. The method of claim 2, wherein the first party submits an identity certificate issued by a third party to the second party as the certified identifier to prove the true identity of the first party, each additional different identity certificate thus submitted tending to increase a measure of confidence by the second party that the identity of the first party is true.

10. The method of claim 2, wherein the digital signature is a transformation of the commercial relationship certificate, the transformation being generated by the first party with a private key that is associated with the public key, so that another party may employ the public key to verify the digital signature.

11. The method of claim 10, further comprising the steps of:

(a) said first party applying to a registry for registration of the digital signature of the first party, the registry confirming the true identity of the first party; and if confirmed, (b) registering the digital signature of the first party with the registry, the digital signature being registered with the registry until the registry is informed that the private key associated with the digital signature is not secure.

12. The method of claim 11, wherein the first party provides to the registry a certificate issued by another registry, the registry employing the certificate issued by the other registry to confirm the true identity of the first party.

13. The method of claim 1, wherein when presented with the commercial relationship certificate digitally signed by the first party, the second party employs a replay detector to determine if the certificate has been previously used for this purpose since it was digitally signed by the first party.

14. The method of claim 1, further comprising the steps of:

(a) issuing a delegation certificate to a delegate over the unsecure network, the delegation certificate providing the delegate with an authority to negotiate with the seller on behalf of the first party;

(b) including with the delegation certificate an authorization for the payment, the first party digitally signing the delegation certificate to provide the authorization and delegate using the delegation certificate to negotiate with the seller;

(c) presenting the delegation certificate to the seller, the delegate providing the delegation certificate with the authorization to the seller as payment for the goods; and (d) said seller redeeming the delegation certificate with the second party to obtain the payment from the financial resources accessible by the first party.

15. The method of claim 1, wherein the first party is a client and the second party is a financial institution.

16. The method of claim 1, wherein the first party is a customer and the second party is a non-financial institution, including a service provider and a merchant.

17. A method for obtaining a certificate employed to facilitate transactions between a first party and a second party over an unsecure network without requiring encryption of the entire certificate, the certificate being issued by the second party and assuring an authenticity of the first party, comprising the steps of:

(a) enabling said first party to submit a public key to the second party over the unsecure network for signature by the second party, and enabling the first party to provide proof of its identity to the second party;

(b) confirming the identity of the first party;

(c) combining the public key with a unique reference identifying the first party in connection with business transacted between the first and the second parties, the combination of the public key and the unique reference being digitally signed by the second party to produce the certificate; and (d) issuing the certificate to the first party over the unsecure network, said first party being thereafter enabled to digitally sign and submit the certificate to the second party over the unsecure network to prove a right of the first party to transact the business with the second party.

18. A method for performing an electronic commerce transaction for goods on an unsecure network without requiring encryption of all documents employed for performing the electronic commerce transaction, using a Letter Of Credit (LOC), comprising the steps of:

(a) applying for a LOC with an opening bank, a buyer being approved for the LOC when a true identity of the buyer and terms of the LOC have been authenticated by the opening bank, the opening bank being associated with accessing financial resources of the buyer;

(b) said buyer providing an identifier of the buyer to the opening bank, the identifier enabling the opening bank to independently determine the true identity of the buyer;

(c) said opening bank issuing a certificate that is digitally signed by the opening bank and which includes the identifier and a reference to the LOC, the opening bank sending the certificate to the buyer and a seller over the unsecure network;

(d) said seller sending the certificate to an advising bank, the advising bank being associated with a beneficiary of the electronic commerce transaction;

(e) said buyer sending a document to the advising bank over the unsecure network, when the terms of the LOC have been met; and (f) presenting the certificate to the opening bank for payment of the LOC, the certificate having been digitally signed by the advising bank to indicate that the advising bank guarantees the seller has met all of the terms of the LOC, said opening bank sending the payment for the goods to the advising bank for dispersal to the beneficiary.

19. The method of claim 18, further comprising the steps of:

(a) confirming that the certificate is valid, the advising bank verifying that the opening bank has issued the certificate for the LOC; and (b) confirming the terms of the LOC, the advising bank and the opening bank determining the terms that must be completed before the certificate may be redeemed at the opening bank.

20. The method of claim 18, wherein the terms of the LOC identify a type for the document, said document comprising one of a bill of lading and a receipt.

21. The method of claim 18, further comprising the step of reviewing the performance of the terms of the LOC, the advising bank negotiating with the seller to ensure performance of the terms.

22. The method of claim 21, wherein the advising bank determines that the seller has not met the terms of the LOC, the advising bank advising the opening bank that the terms of the LOC have not been met over the unsecure network.

23. The method of claim 21, wherein the advising bank determines that the seller has only partially completed the terms of the LOC, further comprising the step of the advising bank accepting liability for completion of all terms of the LOC and digitally signing the certificate to confirm acceptance of the liability.

24. The method of claim 18, wherein the beneficiary is identified in the terms of the LOC as a recipient of the payment for the goods.

25. The method of claim 18, wherein the beneficiary is the seller.

* * * * *

UNITED STATES PATENT AND TRADEMARK OFFICE
CERTIFICATE OF CORRECTION

| | | |
|---|---|---|
| PATENT NO. | : 7,003,480 B2 | Page 1 of 1 |
| APPLICATION NO. | : 09/032407 | |
| DATED | : February 21, 2006 | |
| INVENTOR(S) | : Barbara L. Fox et al. | |

It is certified that error appears in the above-identified patent and that said Letters Patent is hereby corrected as shown below:

On the Title page, Item (56), under "Foreign Patent Documents", in column 2, line 1, after "10/1983" insert -- G06F 15/30 --.

On page 2, Item (56), under "Other Publications", in column 2, line 4, below "1-2.*" insert -- Bruce Schneier, APPLIED CRYPTOGRAPHY 2d. (New York: John Wiley & Sons, Inc., 1996) pp. vii, 37-39 & 483-502.* --.

In column 14, line 7, delete "share_key_request(31)," and insert -- shared_key_request(31), --, therefor.

Signed and Sealed this

Thirtieth Day of March, 2010

David J. Kappos
*Director of the United States Patent and Trademark Office*